(12) United States Patent
Volk

(10) Patent No.: US 11,533,921 B1
(45) Date of Patent: Dec. 27, 2022

(54) STACKABLE RETAINER FOR POULTRY HOCKS

(71) Applicant: Volk Enterprises, Inc., Turlock, CA (US)

(72) Inventor: Drew A. Volk, Turlock, CA (US)

(73) Assignee: Volk Enterprises, Inc., Turlock, CA (US)

(*) Notice: Subject to any disclaimer, the term of this patent is extended or adjusted under 35 U.S.C. 154(b) by 0 days.

(21) Appl. No.: 17/473,081

(22) Filed: Sep. 13, 2021

(51) Int. Cl.
*A22C 21/00* (2006.01)

(52) U.S. Cl.
CPC .................. *A22C 21/0007* (2013.01)

(58) Field of Classification Search
CPC .................................................. A22C 21/0007
USPC .......................................... 452/185, 178, 188
See application file for complete search history.

(56) References Cited

U.S. PATENT DOCUMENTS

| | | | |
|---|---|---|---|
| 4,739,538 A | 4/1988 | Volk | |
| 4,771,509 A * | 9/1988 | Volk | A22C 21/0038 452/176 |
| 5,102,370 A | 4/1992 | Volk | |
| 5,112,274 A | 5/1992 | Volk | |
| 5,181,880 A | 1/1993 | Volk | |
| 5,423,720 A * | 6/1995 | Volk | A22C 21/0038 452/176 |
| 5,487,700 A * | 1/1996 | Dillard | A22C 21/0007 452/179 |
| 5,498,201 A | 3/1996 | Volk | |
| 5,735,736 A | 4/1998 | Volk | |
| 5,749,778 A | 5/1998 | Volk | |
| 7,014,553 B1 | 3/2006 | Volk | |
| 7,175,518 B2 | 2/2007 | Volk | |
| 7,591,719 B1 | 9/2009 | Thompson | |

* cited by examiner

*Primary Examiner* — Richard T Price, Jr.
(74) *Attorney, Agent, or Firm* — Laurence P. Colton; Smith Tempel Blaha LLC

(57) ABSTRACT

A poultry leg retainer having a bridle having a spar and side members defining loops or openings adapted to receive the hocks; an extensible strap attached to the spar and extending across the loops or openings and adapted to cooperate with knuckle creases on the hocks; a separator or tab projecting from the spar inwardly between the loops or openings for cooperating with the hocks so as to assist in retaining the hocks within the loops or openings; and an anchor having upturned ends adapted for engagement with an interior cavity of the poultry carcass, the bridle and extensible straps forming a basket structure for retaining the hocks to truss the legs against the poultry carcass. The anchor can have a front surface defining a protrusion and a back surface defining a groove complementary to the protrusion, the protrusion of one retainer being fittable within the groove of another retainer.

12 Claims, 17 Drawing Sheets

STACKABLE RETAINER FOR POULTRY HOCKS

BACKGROUND OF THE INVENTION

Technical Field

The present invention relates generally to a stackable retainer device for trussing or retaining the hocks of poultry carcasses to securely retain the legs in juxtaposition during processing, packaging, shipping and possibly cooking and relates more particularly to retainers, for engaging the hocks and body of a poultry carcass, that can be stacked together for storing, shipping, and user convenience.

Prior Art

As appreciated by those skilled in the art, the processing, packaging and shipping of poultry carcasses can be made easier by creating relative uniformity amongst trussed poultry carcasses. For example, if the hocks of poultry carcasses are protruding from the animal carcass, then the extending limbs can interfere with packaging machinery and tear the packaging material, which often is a thin polymer. Trussing the hocks, thereby holding the legs together close to the body, can help to avoid this problem. Additionally, trussing draws the poultry legs back and creates a visual impression that the poultry breast is larger, and therefore makes the trussed poultry more appealing to the purchaser. Further, it is easier to cook a trussed poultry carcass, especially on a rotisserie, as the legs will be retained against the body and not flop about. Similarly, as the poultry carcasses can be cooked more easily, there is an added benefit of trussing poultry carcasses to consumers, and this can be exploited by advertising by the retailer.

Over the years, many brackets, clamps, retainers, and similar devices have been developed for retaining or trussing the hocks of poultry carcasses during cooking, shipping, and processing, some in the past of metal and wire, but most recently of nylon or plastic. Not surprisingly, the prior art discloses many means for trussing the hocks of poultry carcasses. A few exemplary trussing devices are discussed below.

U.S. Pat. No. 4,739,538 to Volk discloses a retainer for poultry hocks having a central locking member cooperating with straps for positively securing poultry legs tightly against each of the hocks, together with anchors into kidney openings in the poultry backbone. U.S. Pat. No. 5,102,370 to Volk discloses a hock cap covering the entire hock wherein such a hock cap has a FIG. 8 structure with an ankle strap having a lower portion that engages the back side of the ankles. U.S. Pat. No. 5,112,274 to Volk discloses a snap-on ankle strap poultry-trussing device having a lower portion with an indent that extends upwardly between the exposed hocks of the carcass. The ankle strap is slipped over the exposed hocks, grasps the ankles of the poultry carcass, and holds them together. U.S. Pat. No. 5,181,880 to Volk discloses a method of trussing poultry by making slits in the skin and passing the hocks through the slits and then attaching a snap-on hock cap to hold the hocks together.

U.S. Pat. No. 5,498,201 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the hocks in juxtaposition. U.S. Pat. No. 5,735,736 to Volk discloses a retainer for poultry hocks that is formed as an oblong ring of a thin unitary plastic. The ring has a plurality of prong portions extending inward. The poultry hocks are inserted through the ring and the prongs engage the poultry legs so as to hold the legs substantially perpendicular to the retainer and parallel to each other. U.S. Pat. No. 5,749,778 to Volk discloses a retainer for poultry hocks that is formed as a ring of a thin unitary plastic material and has hinged flaps extending inward from opposite sides thereof. The poultry hocks are inserted through the ring to cause the flaps to bend outward and then to partially retract backward so that the edges of the flaps engage behind the hock knuckles, holding the thighs close to the body of the fowl. U.S. Pat. No. 7,175,518 to Volk discloses a retainer for poultry hocks that is formed as a unitary, plate-like member of resilient material that includes two openings for fitting over the hocks.

U.S. Pat. No. 7,014,553 to Volk discloses a device for retaining and trussing the hocks of poultry carcass in juxtaposition and proximal to the body during processing, packaging, shipping, storage, and/or cooking. The device may be constructed of a unitary, plate-like member of resilient material and includes two openings for fitting about and retaining the hocks, an anchor to be affixed to the poultry carcass, and a connecting means between the hock retaining members and the anchor. The connecting members provide a spring force to keep the hocks and thus the legs juxtaposed to the carcass and each other. U.S. Pat. No. 7,591,719 to Thompson discloses a retainer constructed as a unitary, plate-like member of resilient material, wherein the retainer includes a bridle having a resiliently flexible upper member connected at opposed ends to a lower semi-rigid spar, with a separator interconnecting the upper member and the spar at midpoints thereof. The upper member, spar, and separator define a pair of receiving openings or loops adapted to receive the hocks of the poultry legs. The retainer is preferably secured to the poultry carcass by an anchor having upturned ends that are adapted for engagement within the interior cavity of the poultry carcass, the anchor being connected in a depending relation to the bridle by extensible legs.

While the known prior art has advantages for certain situations, there is a constant need for poultry trussing devices that are: (1) less expensive to manufacture; (2) easier to mount on the hocks and easier to insert into the body of carcass; (3) easier to dismount from the hocks, (4) less costly to ship; (5) able to hold the hocks more securely; (6) able to be mounted automatically if desired; and (7) able to be neatly stacked when held as a plurality, or combinations of these, for ease of packaging, storing, transporting, and use. Thus, there is always a need for a hock retainer generally for trussing poultry carcasses and specifically for fitting about the hocks so as to hold the legs proximal to each other and to the body of the carcass. There also is always a need for a relatively simple device that can be manufactured simply and inexpensively, and easily is mounted on and dismounted from the hocks. There additionally is always a need for a hock retainer that is less labor-intensive to attach to the poultry and allows more throughput per worker. There further always is a need for a hock retainer that has less interaction or contact with packaging materials. It is to these needs and others that the present invention is directed.

BRIEF SUMMARY OF THE INVENTION

Briefly described, the present invention is a device for retaining and trussing the hocks of an eviscerated poultry carcass in juxtaposition to each other and proximal to the body during processing, packaging, shipping, storage, and/or cooking, a plurality of the devices being stackable together for storage, shipping, ease of use, etc. The retainer of the present invention may be constructed as a unitary, plate-like or planar member of resilient material. The retainer includes a bridle having a resiliently flexible upper member connected at opposed ends to a lower semi-rigid spar, with a separator interconnecting the upper member and the spar at midpoints thereof. The upper member, spar, and separator define a pair of receiving openings, loops, or sets of loops adapted to receive the hocks of the poultry legs. The retainer is preferably secured to the poultry carcass by an anchor having upturned ends that are adapted for engagement within the interior cavity of the poultry carcass. The anchor is connected in a depending relation to the bridle by extensible legs.

Each receiving opening or loop comprises at least one extensible resilient strap that extends in a serpentine manner across the loop and has a first attachment to the upper member and a second attachment to the spar. The straps are adapted to engage a cleft or crease between the knuckle-shaped end of the leg bone at the hock. Each loop optionally further comprises a tab projecting inwardly from the upper member into the loop opening for guiding the leg ends into engagement with the resilient straps and for preventing the leg ends from extending through the loops. The tab is located at the outer periphery of the respective loop so that the leg ends are guided inwardly. The tab passes over the hock knuckle and comes to rest behind the hock knuckle at the ankle so as to retain the hock more securely within the loop and to create and complete a generally basket-like structure out of the loop and resilient strap when properly on the hock.

An appendage, preferably a ring or partial ring, may be attached to the bridle and/or may be disposed in depending relationship to the spar for permitting manipulation of the retainer. For example, the appendage provides a lever for pivoting the bridle relative to the extensible legs and the anchor. For another example, the appendage provides a handle for manipulating the retainer, assisting to insert the retainer into the poultry carcass, and/or pulling the bridle over the hocks.

In one embodiment, in use, after the anchor is inserted into the poultry's cavity and anchored, the user grasps the appendage and pulls upwardly (generally away from) relative to the bird, thus rotating the bridle up to approximately 180 degrees, the hocks are placed in the bridle such that the resilient straps cooperate with the creases in the knuckles of the hocks, and the bridle is released. The bridle attempts to return (rotate back) to its original position due to the elasticity of the material of construction, thus locking the hocks with the bridle. The resilient straps fit in the knuckle crease, the outer portions of the bridle fit over the hocks, the separator fits between the ankles, and the tabs fit behind the hock knuckles at the ankles, thus helping to secure the hocks.

In another embodiment, in use, after the anchor is inserted into the poultry's cavity and anchored, the user grasps the appendage and pulls upwardly and generally towards the bird, thus rotating the bridle up over the hocks, and the hocks are placed in the bridle such that the resilient straps cooperate with the creases in the knuckles of the hocks. The elasticity of the material of construction locks the hocks with the bridle. The resilient straps fit in the knuckle crease, the outer portions of the bridle, or additional resilient straps, fit over the hocks, and the separator fits between the ankles, thus helping to secure the hocks.

The structure of the anchor of the present invention, and the retainer structure as a whole, securely engages the invention to the bird and reduces the number of incorrect applications, thus increasing the throughput of birds per worker and decreasing disengagements from the bird during processing, transport, or cooking. For example, placement of the separator between the hocks and the fitting of the separator between the ankles is automatic, which is but one advantageous feature of the present invention relative to known trussing devices. For another example, the optional tab relatively easily slips behind the hock to the ankle to secure the hock within the invention. For another example, the anchor readily inserts and embeds itself into the body of the carcass to secure the invention to the carcass.

An inventive concept of the present invention further includes an anchor having front-back surface asymmetry so as to allow a plurality of the anchors to be efficiently stacked together. The asymmetric anchor readily engages with other similarly structured retainers of the present invention, for example, when a plurality of retainers is stacked flush against one another in a group, the front side of the anchor of one retainer nests comfortably within the back side of the anchor of an adjacent retainer. To accomplish this object, one side of the anchor has a protrusion and the other side of the anchor has a groove such that the protrusion of a first anchor on a first device can fit within the groove of a second anchor of a second device. The protrusion and groove can be structured to provide a friction fit between the protrusion of one anchor and the groove of another anchor such that a stack of devices will remain stacked until separated by a user.

The stackable feature allows the elimination of binding devices such as rubber bands to hold a plurality of retainers together. In the art, retainers often are shipped and stored in bundles of multiple retainers held together by rubber bands and the like. Rubber bands and other such binding devices can drop into a bird, causing contamination. Rubber bands and other such binding devices also can be a safety hazard for a number of reasons, such as by snapping off and hitting a worker in the eye, or by falling into and remaining in the bird's cavity thus making it way to the consumer and/or possibly creating a recall situation.

The stackable feature also has several additional advantages in the packaging and use of the retainers. For one example, the stackable feature can help automate packaging of the retainers during manufacture as the retainers can be stacked in a precise manner. For another example, the stackable feature can allow for a machine to be programmed to stack a certain number of retainers into a stack of retainers for packaging and shipping to the poultry processors, as the retainers do not need to be picked up by hand and wrapped in a rubber band. For yet another example, a stack of retainers can remain releasably connected in the user's hand while removing one retainer at a time, whereas when using a rubber band, the rubber band is removed from the stack leaving a pile of unconnected retainers in the user's hand.

These features, and other features and advantages of the present invention, will become more apparent to those of ordinary skill in the relevant art when the following detailed description of the preferred embodiments is read in conjunction with the appended drawings in which like reference numerals represent like components throughout the several views.

DETAILED DESCRIPTION OF PREFERRED EMBODIMENTS

Figure 1:
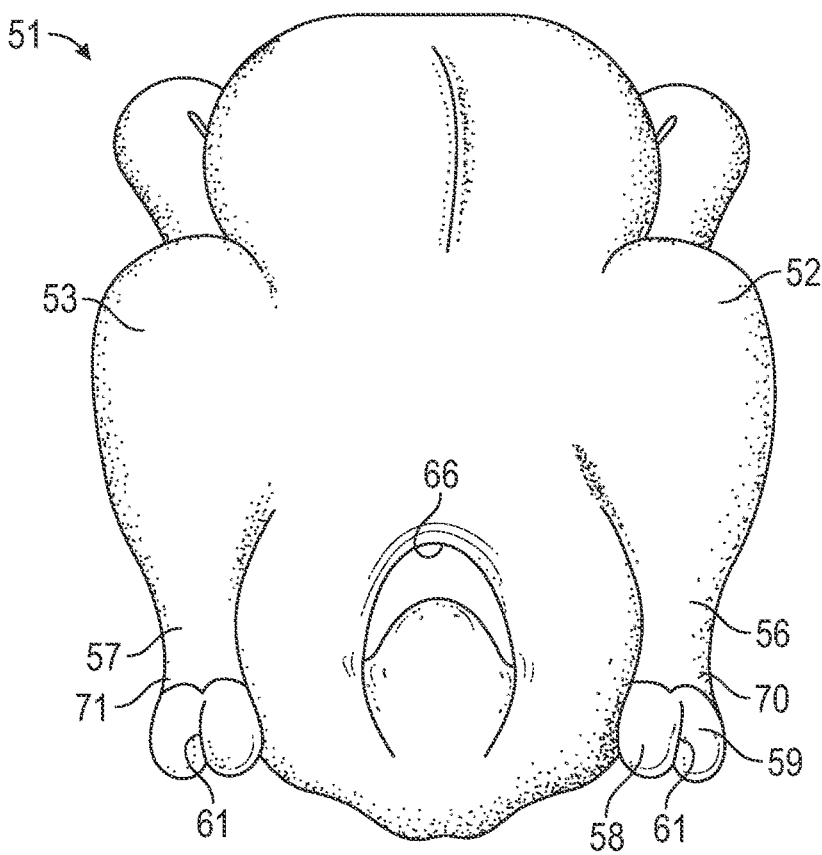
FIG. 1 is a perspective view of a typical eviscerated poultry carcass as often viewed by the consumer.

In the following detailed description, a few exemplary, or representative, embodiments are described to demonstrate the inventive principles and concepts. For purposes of explanation and not limitation, representative embodiments disclosing specific details are set forth in order to provide a thorough understanding of an embodiment according to the present disclosure. However, it will be apparent to one having ordinary skill in the art having the benefit of the present disclosure that other embodiments that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present disclosure.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an", and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings. For example, terms such as "over", "above", "below", "top", "bottom", "upper", and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art.

Where a first device is said to be connected or coupled to a second device, this encompasses examples where one or more intermediate devices may be employed to connect the two devices to each other. In contrast, where a first device is said to be directly connected or directly coupled to a second device, this encompasses examples where the two devices are connected together without any intervening devices other than electrical connectors (e.g., wires, bonding materials, etc.).

Exemplary, or representative, embodiments will now be described with reference to the figures, in which like reference numerals represent like components, elements or features. It should be noted that features, elements or components in the figures are not intended to be drawn to scale, emphasis being placed instead on demonstrating inventive principles and concepts.

The present invention provides an improved retainer or trussing device for the legs of eviscerated poultry, and for better engaging with a poultry carcass, which device is stackable. Generally, the present invention is preferably formed as a single integral unit of nylon, plastic or the like which may be readily produced by standard plastic injection molding techniques. FIG. 1 is a perspective view of a typical eviscerated poultry carcass as often viewed by the consumer.

Figure 2:
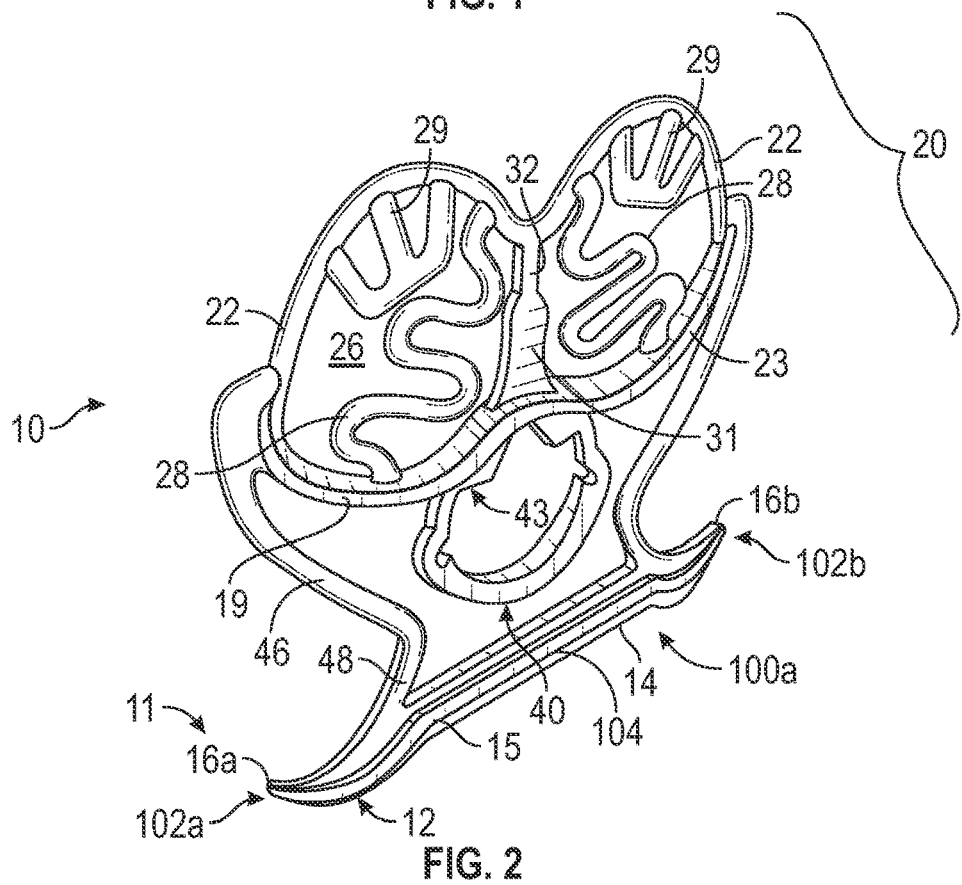
FIG. 2 is a perspective view of a first exemplary embodiment of the retainer of the present invention.
Figure 3:
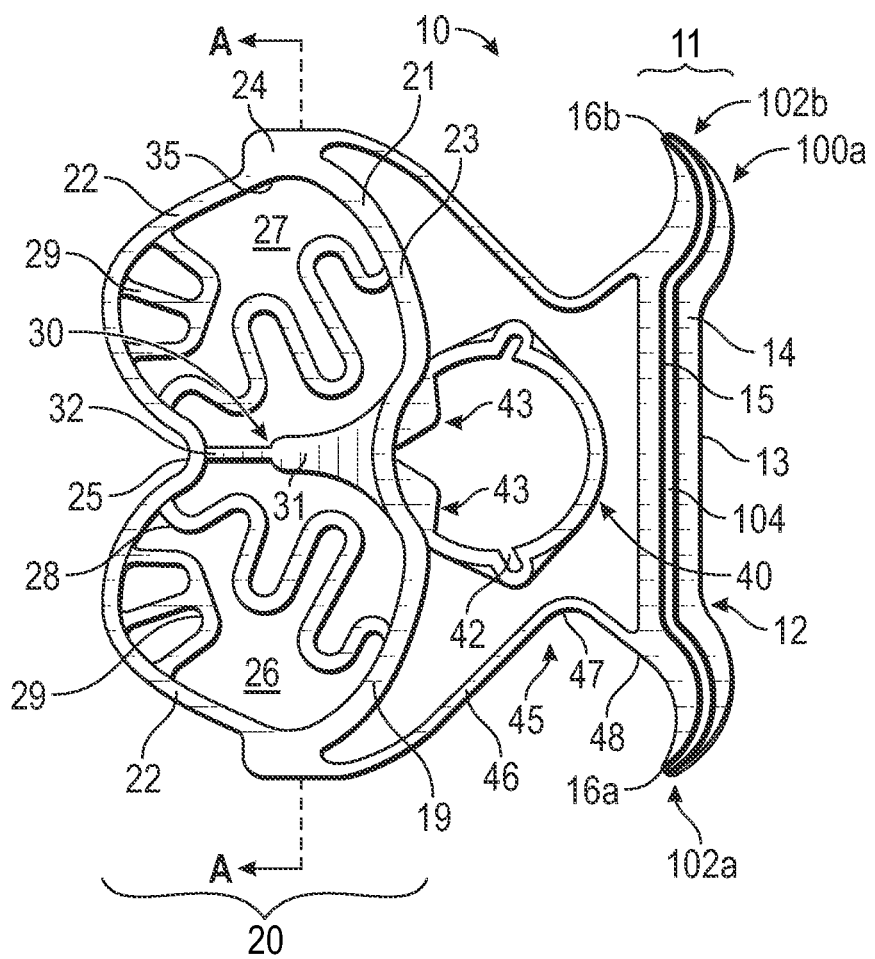
FIG. 3 is a front view of the retainer of FIG. 2.
Figure 4:
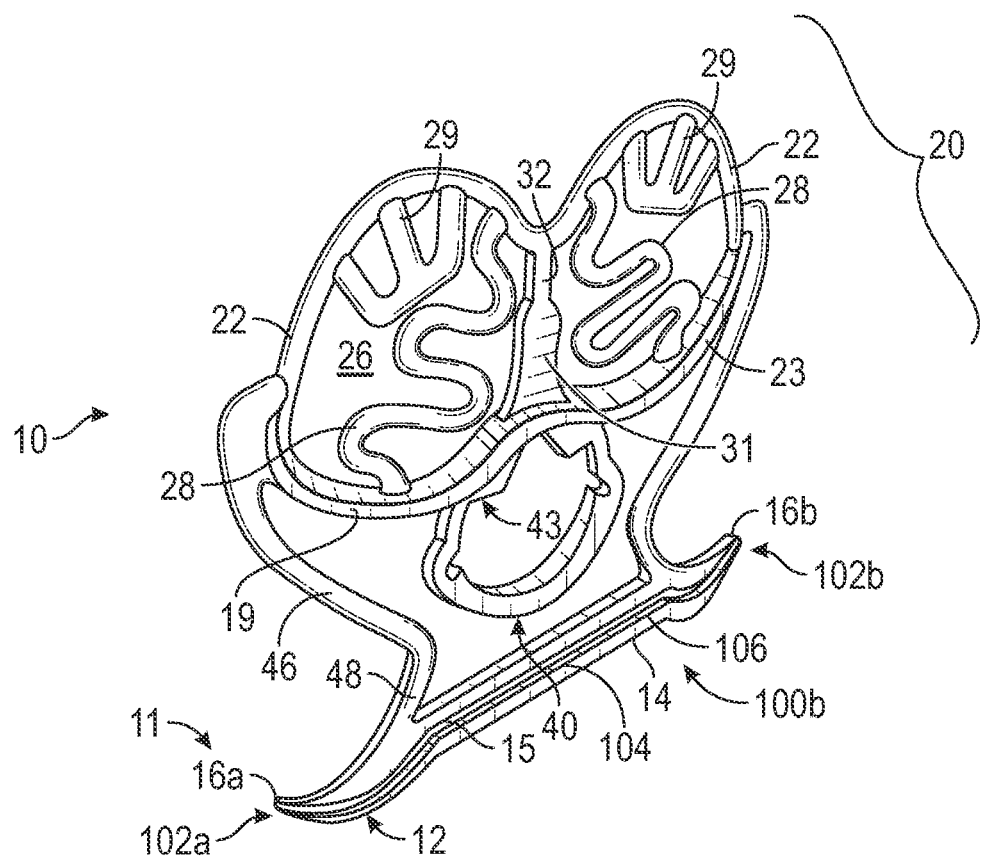
FIG. 4 is a perspective rear view of the retainer of FIG. 2.
Figure 5:
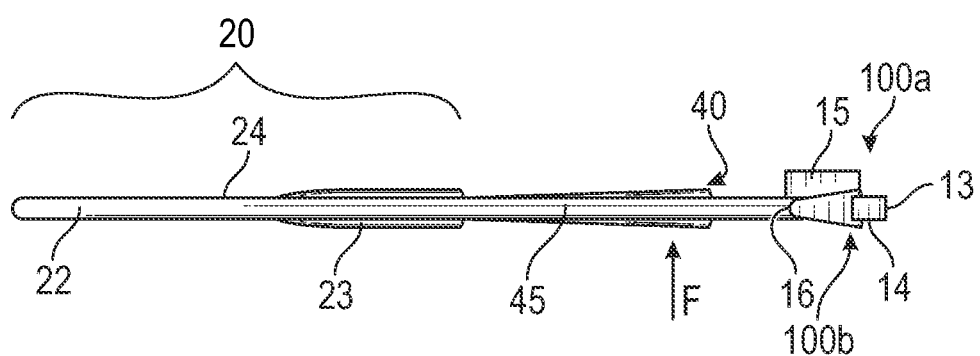
FIG. 5 is a side view of the retainer of FIG. 2.
Figure 6:
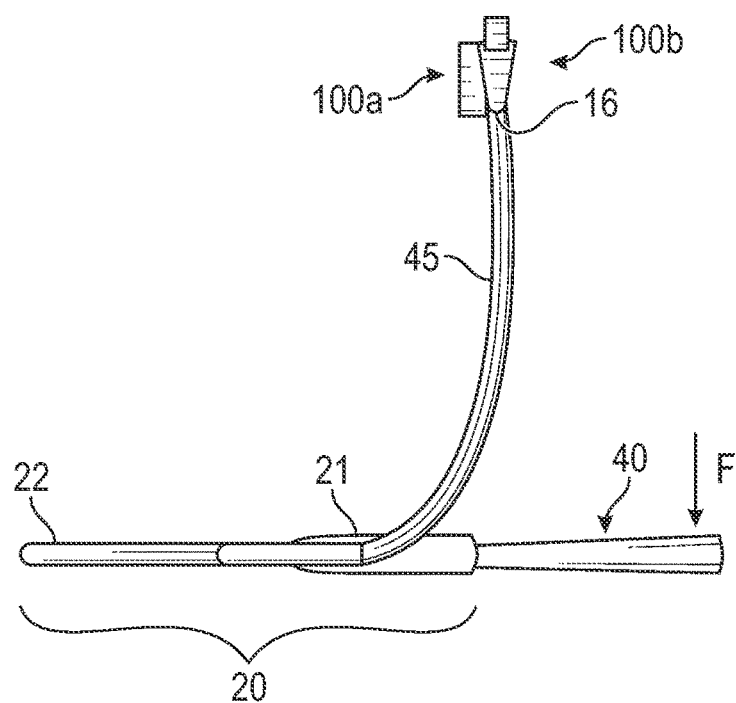
FIG. 6 is a side view of the retainer illustrating flexure of the bridle portion about axis A of FIG. 3.
Figure 7:
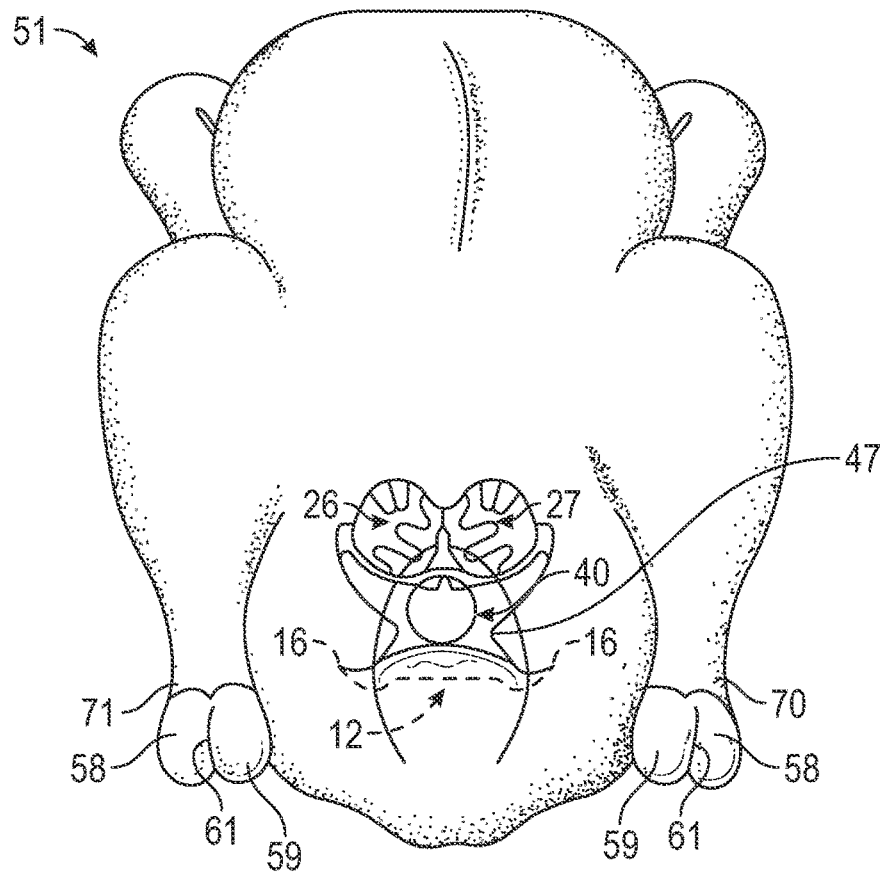
FIG. 7 is a pre-application view of the retainer inserted into the cavity of an eviscerated poultry carcass.
Figure 8:
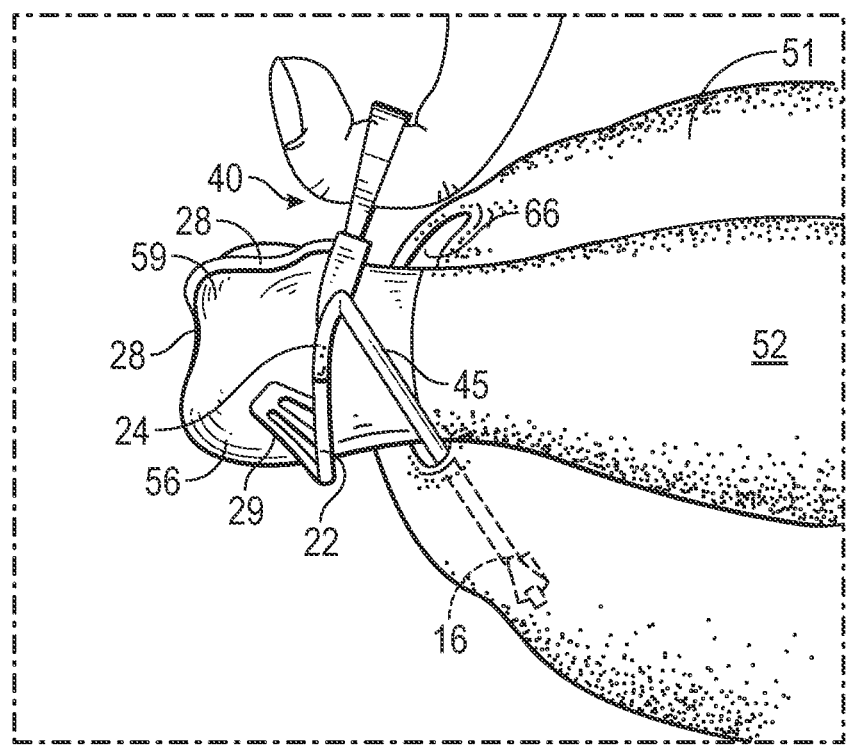
FIG. 8 is a during application view of the retainer relative to an eviscerated poultry carcass.
Figure 9:
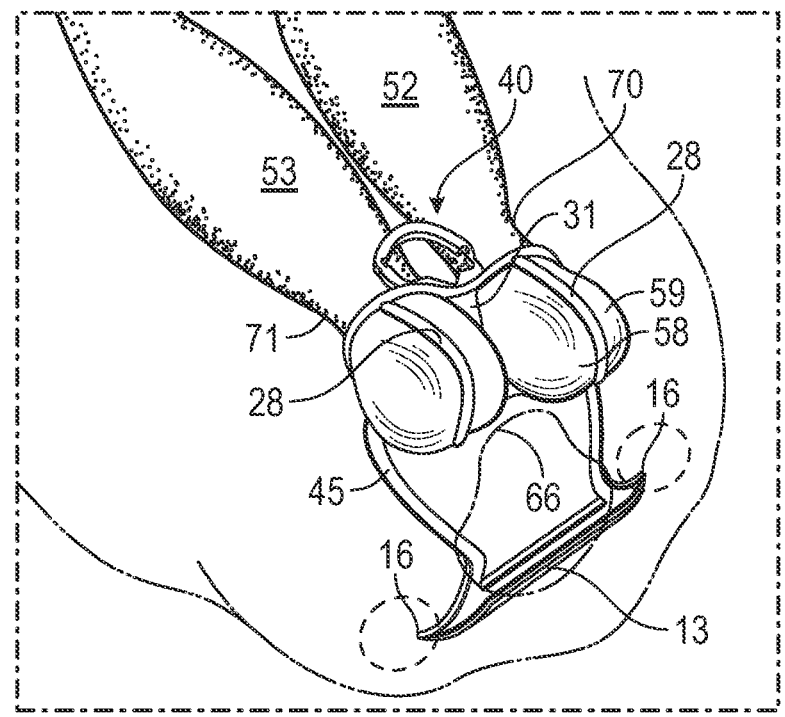
FIG. 9 is a post-application view of the retainer of FIG. 2 securing the hocks of an eviscerated poultry carcass.

FIG. 2 is a perspective view, FIG. 3 is a front view, FIG. 4 is a rear perspective view, and FIG. 5 is a side view of a first exemplary embodiment of the retainer of the present invention. FIG. 6 is a side view of the retainer illustrating flexure of the bridle portion about axis A of FIG. 3. FIGS. 7 through 9 illustrate a pre-application, during application view, and post-application view, respectively, of the retainer securing the hocks of an eviscerated poultry carcass.

Figure 10:
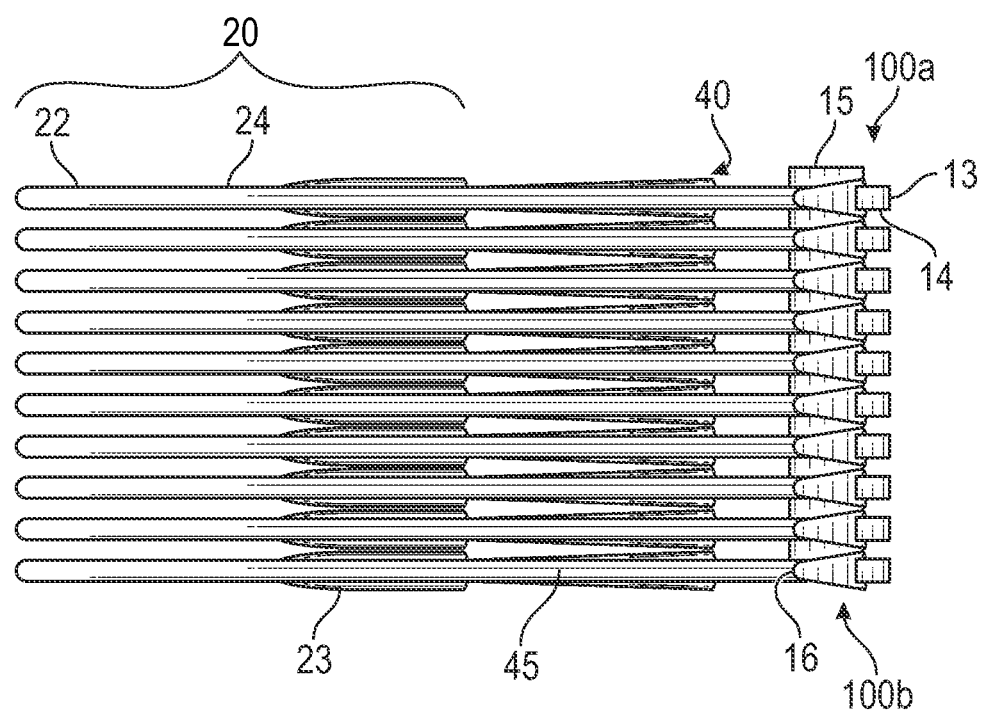
FIG. 10 is a side view of an embodiment of a plurality of retainers of the present invention in a stack.

FIG. 10 illustrates an exemplary embodiment of plurality of retainers in a stack.

Figure 11:
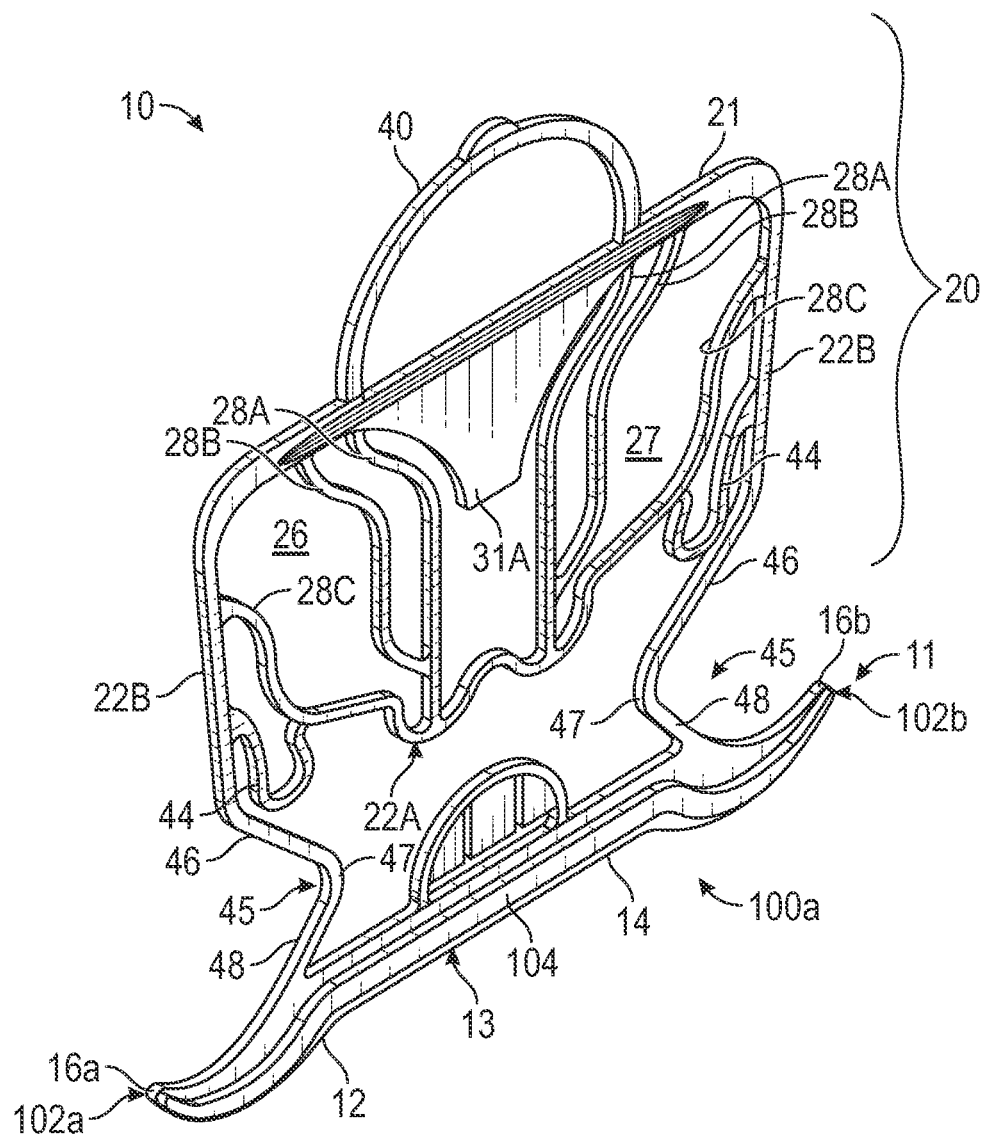
FIG. 11 is a perspective view of a second exemplary embodiment of the retainer of the present invention.
Figure 12:
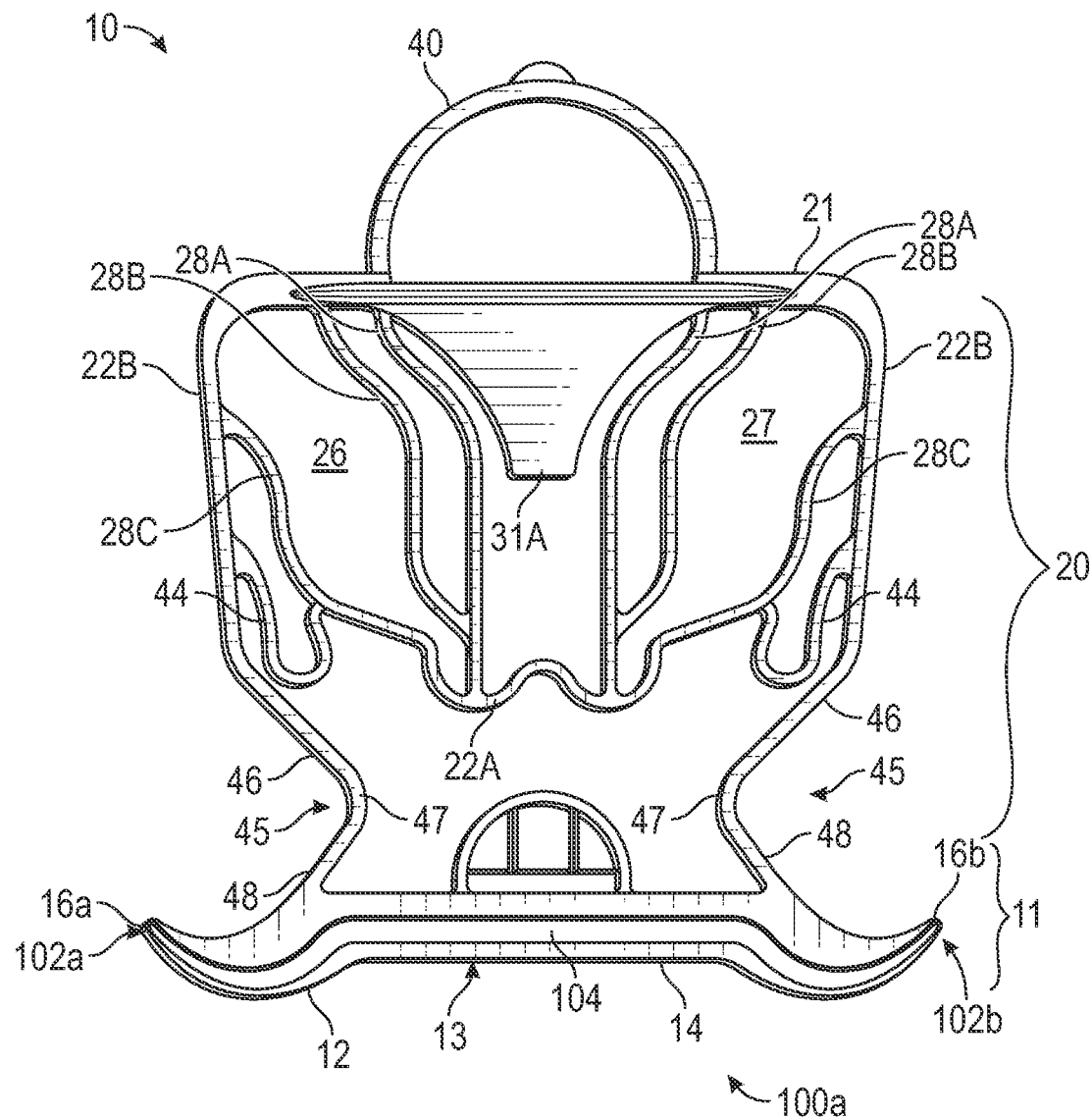
FIG. 12 is a front view of the retainer of FIG. 11.
Figure 13:
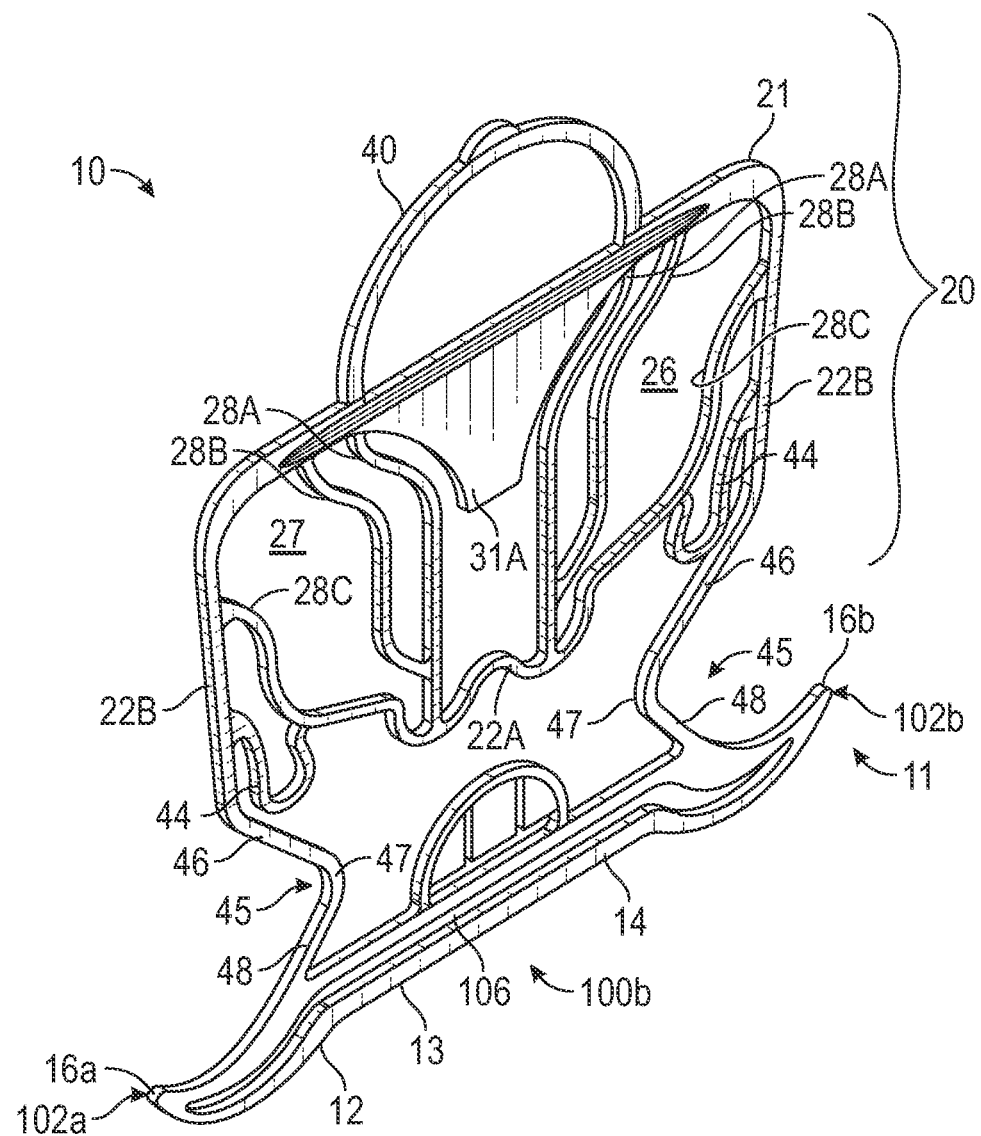
FIG. 13 is a perspective rear view of the retainer of FIG. 11.
Figure 14:
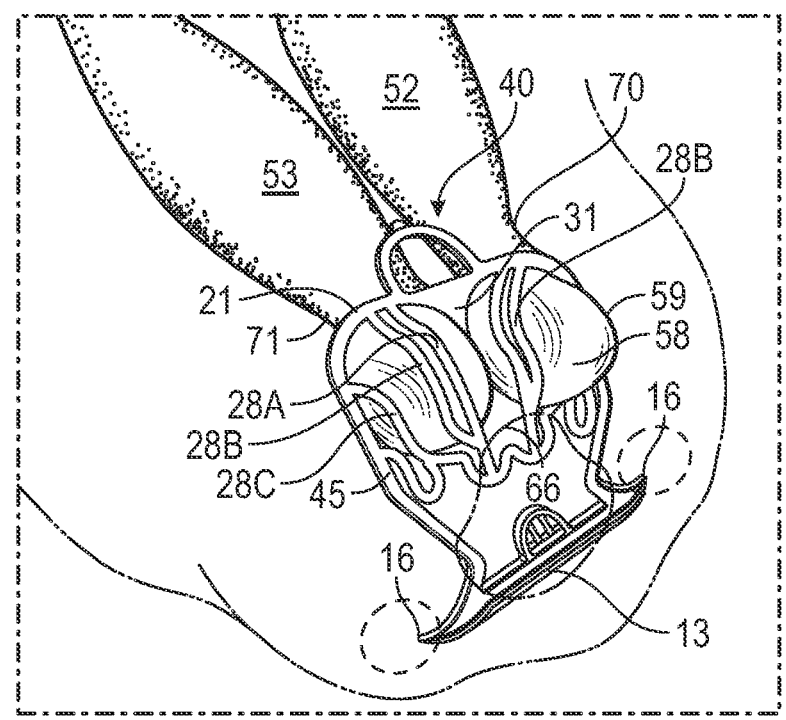
FIG. 14 is a post-application view of the retainer of FIG. 11 securing the hocks of an eviscerated poultry carcass.

FIG. 11 is a perspective view, FIG. 12 is a front view, and FIG. 13 is a perspective rear view of the second exemplary embodiment of the retainer of the present invention shown in FIG. 11. FIG. 14 is a post-application view of the retainer of FIG. 11 securing the hocks of an eviscerated poultry carcass.

Figure 15:
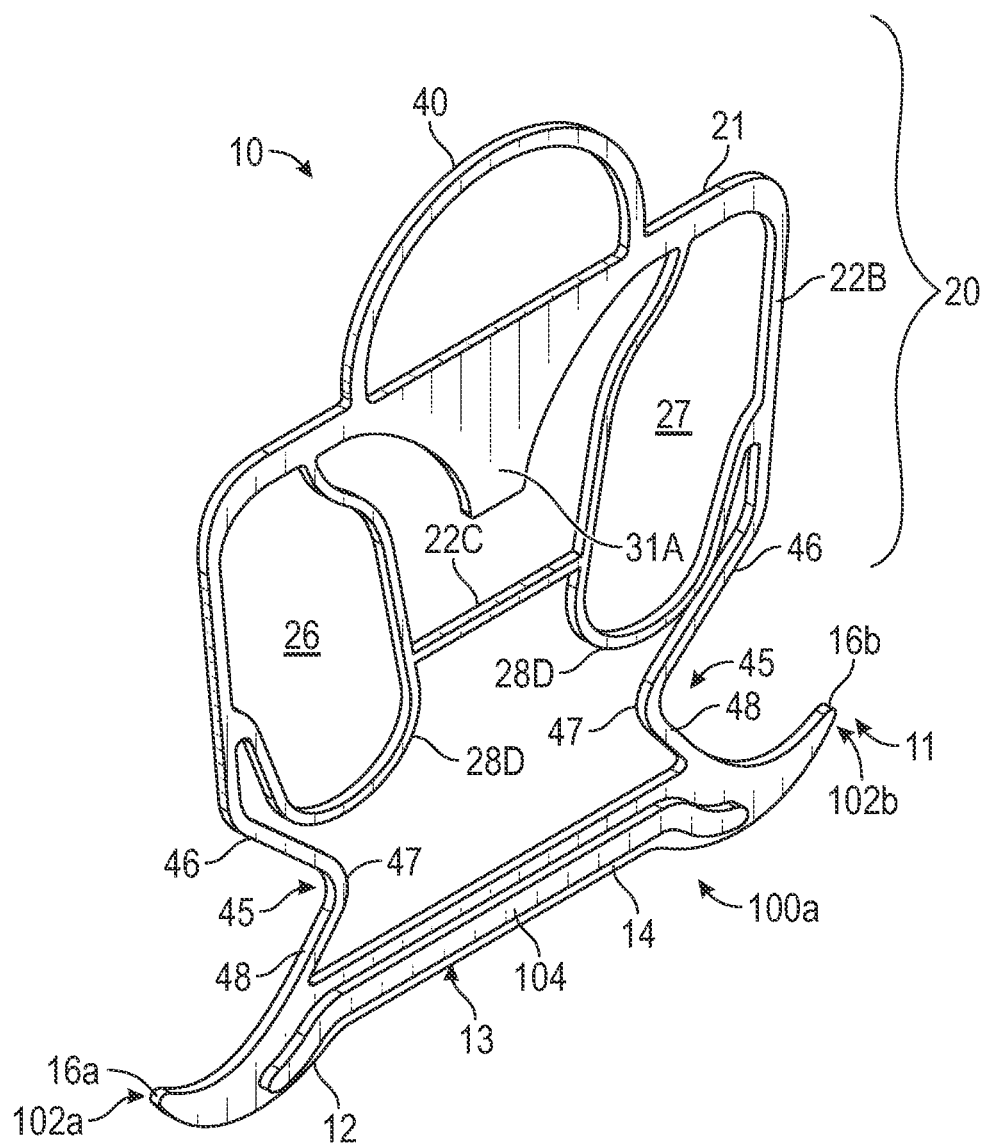
FIG. 15 is a perspective view of a third exemplary embodiment of the retainer of the present invention.
Figure 16:
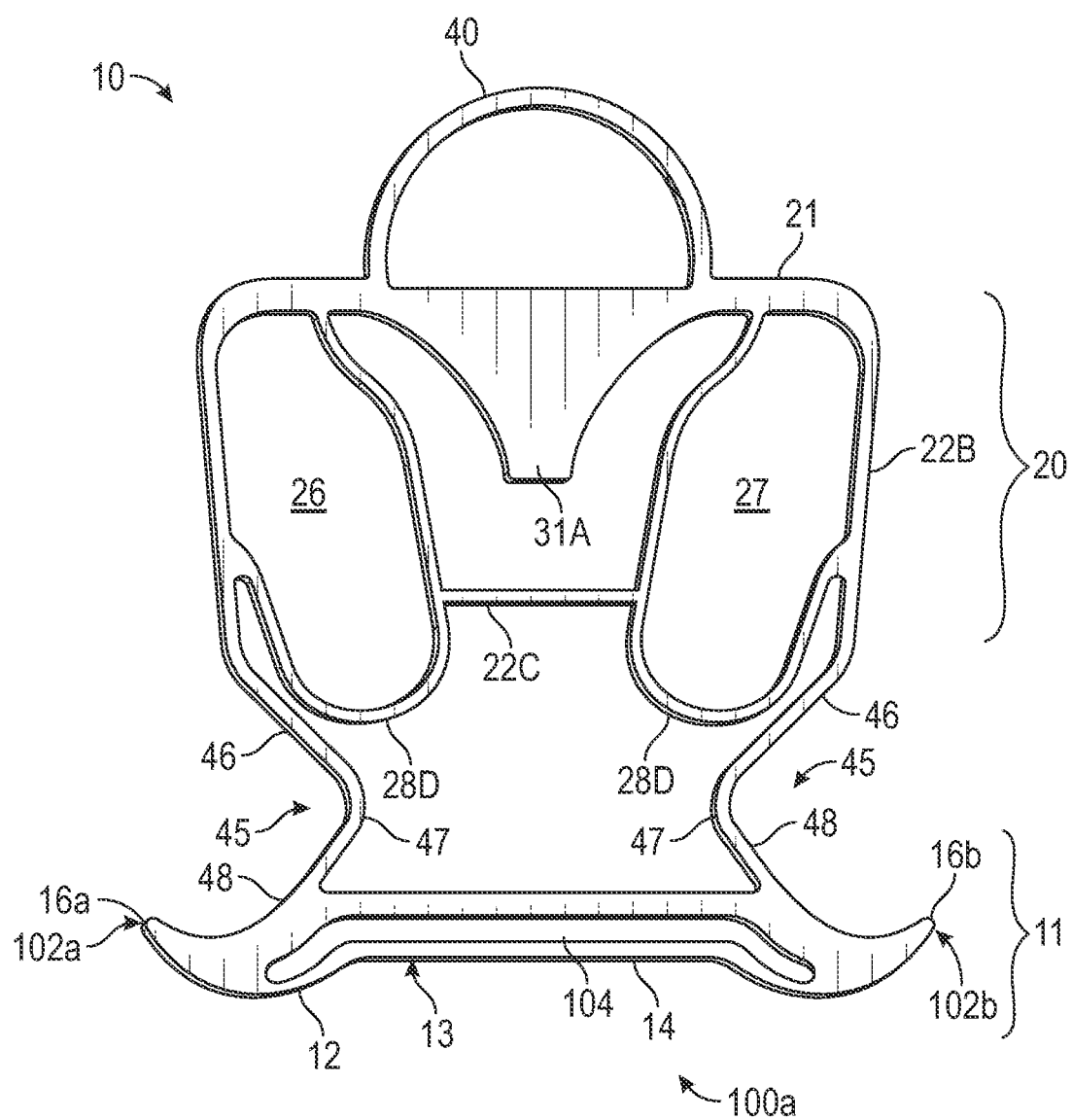
FIG. 16 is a front view of the retainer of FIG. 15.
Figure 17:
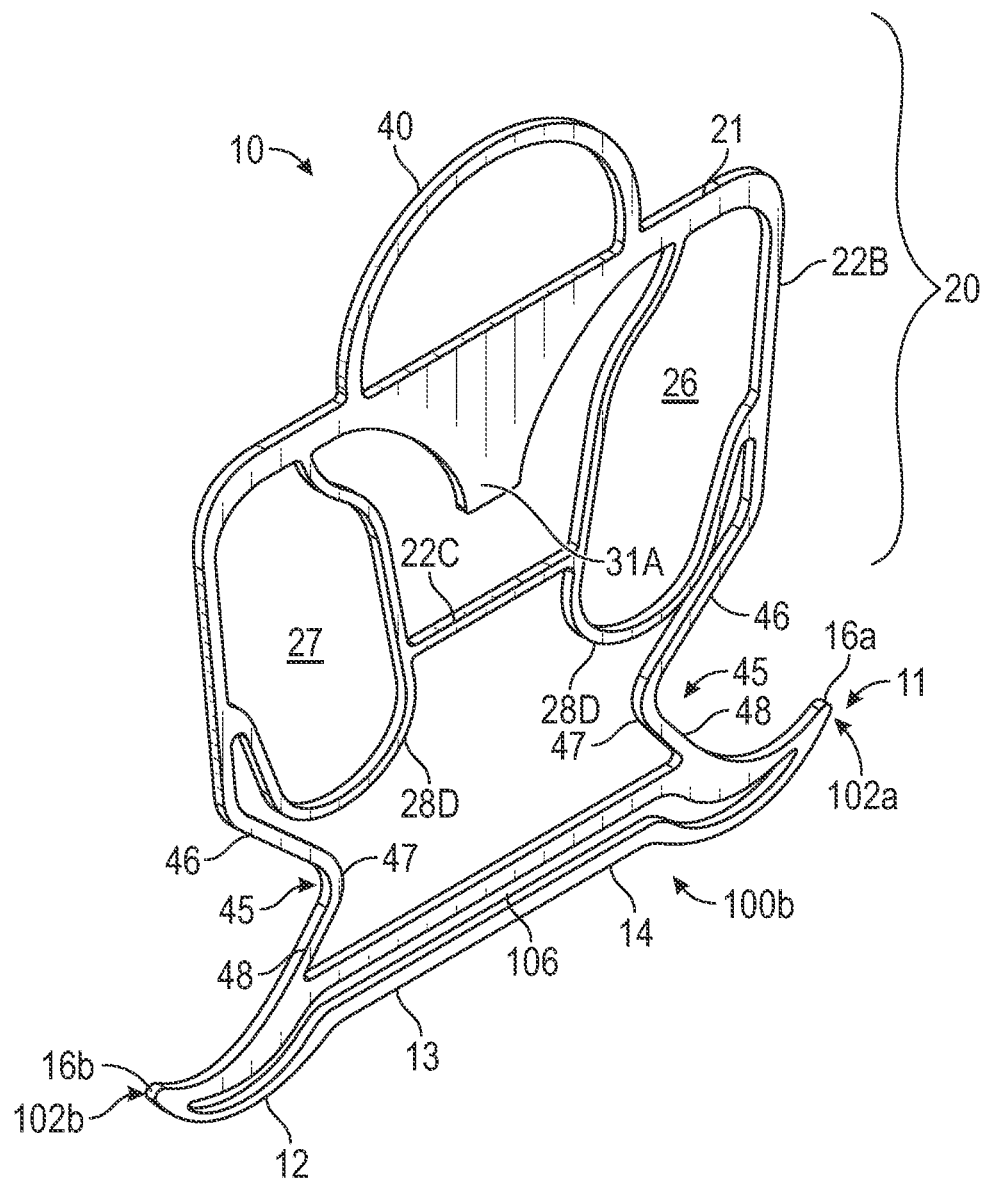
FIG. 17 is a perspective rear view of the retainer of FIG. 15.
Figure 18:
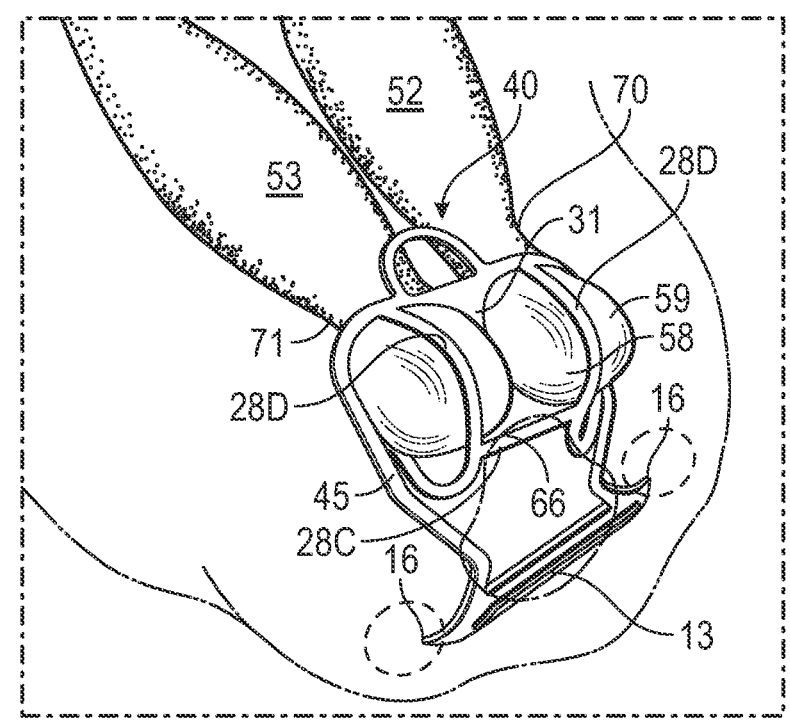
FIG. 18 is a post-application view of the retainer of FIG. 15 securing the hocks of an eviscerated poultry carcass.

FIG. 15 is a perspective view, FIG. 16 is a front view, and FIG. 17 is a perspective rear view of the third exemplary embodiment of the retainer of the present invention shown in FIG. 15. FIG. 18 is a post-application view of the retainer of FIG. 16 securing the hocks of an eviscerated poultry carcass.

Figure 19:
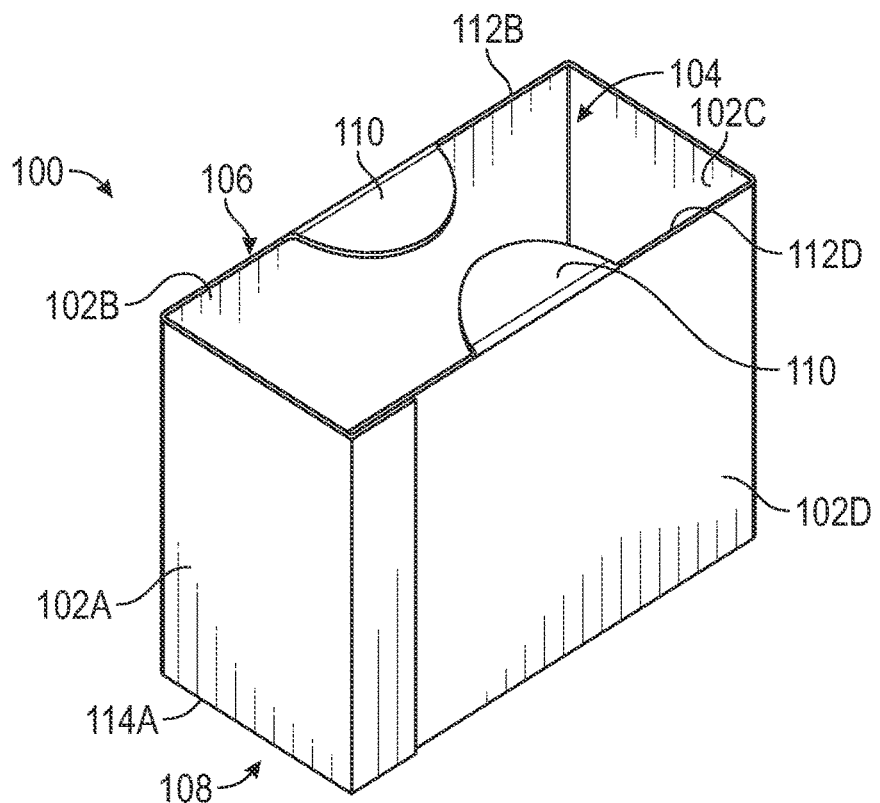
FIG. 19 is a side perspective view of a sleeve for holding, storing, and shipping a plurality of the retainers of the invention.
Figure 20:
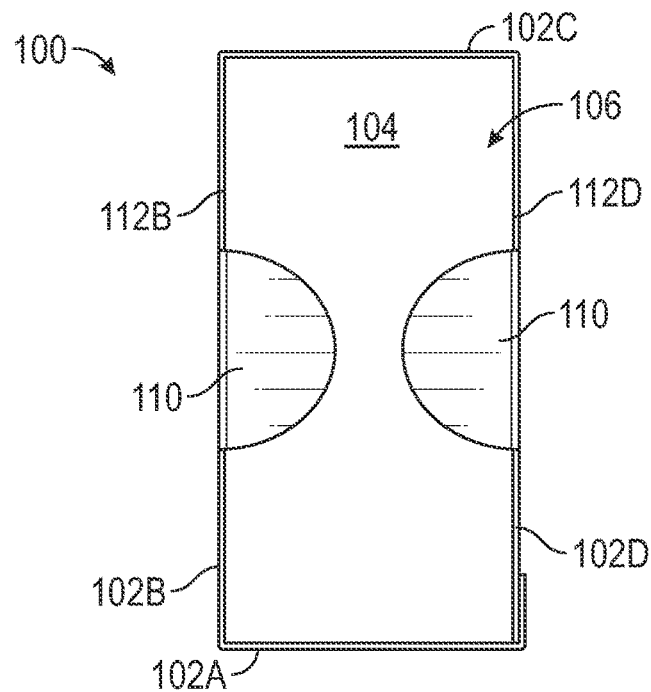
FIG. 20 is a top perspective view of the sleeve of FIG. 19.
Figure 21:
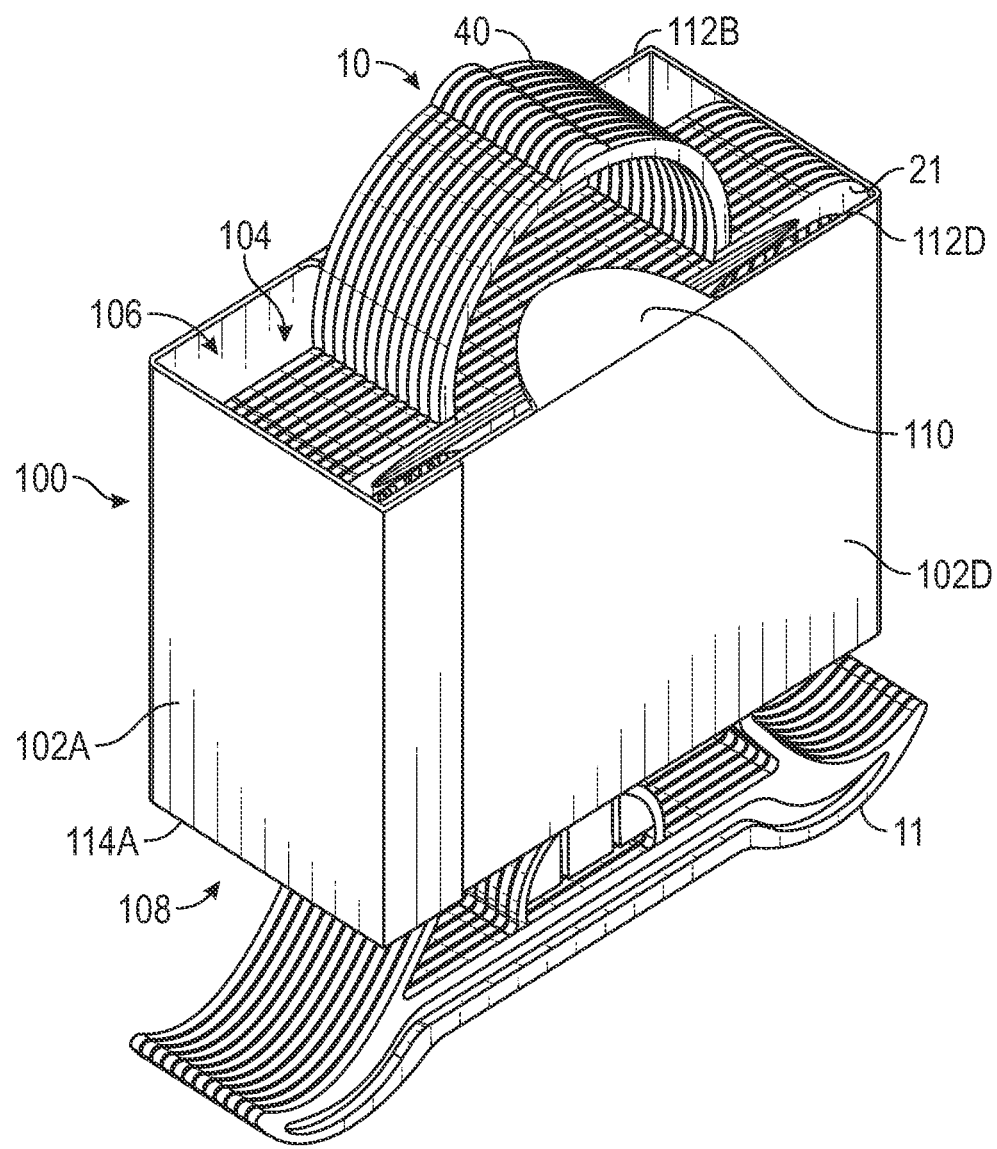
FIG. 21 is a side perspective view of the sleeve of FIG. 19 containing a plurality of the retainers of the invention.
Figure 22:
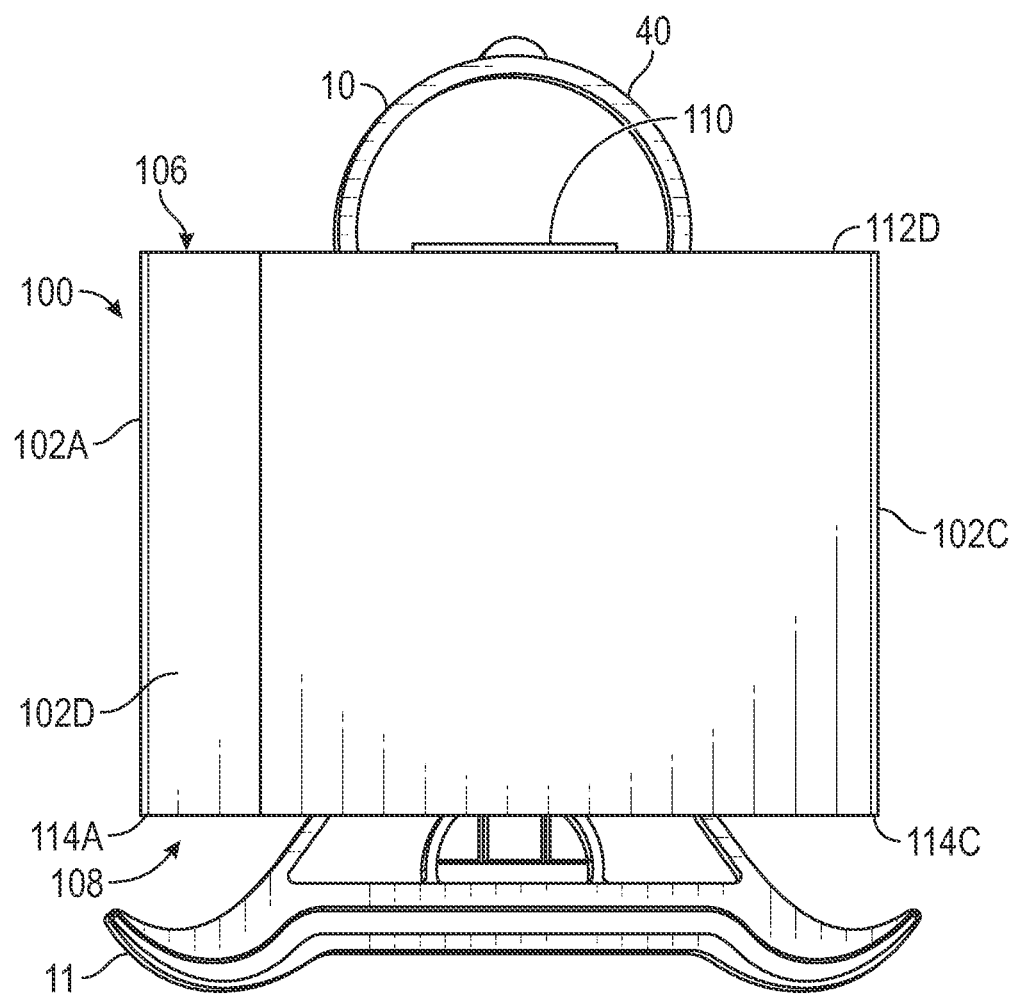
FIG. 22 is a side view of the sleeve of FIG. 19 containing a plurality of the retainers of the invention.

FIG. 19 is a side perspective view of a sleeve for holding, storing, and shipping a plurality of the retainers of the invention. FIG. 20 is a top perspective view of the sleeve of FIG. 19. FIG. 21 is a side perspective view of the sleeve of FIG. 19 containing a plurality of the retainers of the invention and FIG. 22 is a side view of the sleeve of FIG. 19 also containing a plurality of the retainers of the invention.

FIG. 1 is a perspective view of an eviscerated poultry carcass 51 with an open abdominal cavity 66. The illustration shows the eviscerated poultry carcass 51 having legs 52, 53 with the feet removed, terminating in exposed hocks 56, 57, respectively. This view is with legs 52, 53 pointing downward and the breast at the top of the drawing. On a poultry processing line, carcass 51 generally is transported hanging from hocks 56, 57 with legs 52, 53 pointing upward and the breast hanging downward.

FIG. 2 is a perspective view of a first exemplary embodiment of the retainer of the present invention. Retainer 10 of the present invention has an anchor 11 portion for anchoring retainer 10 into cavity 66 of eviscerated carcass 51, and hock retaining means or bridle 20 portion that is designed to hold together exposed hocks 56, 57 of carcass 51 of FIG. 1, which can be particularly advantageous during processing, packaging, shipping, storing, and/or cooking.

Anchor 11 is asymmetrical. The front surface 100a (FIGS. 2-3 front view) compared to the back surface 100b (FIG. 4 rear view) reveal an asymmetry (see FIG. 5, compare front 100a to back 100b), which is not only particularly advantageous for engaging the retainer 10 to the carcass 51 but also for engaging and stacking retainers 10n. In particular, the front surface 100a of the asymmetrical anchor 11 defines a protrusion 104 that extends from one upturned end 102a of the anchor 11 to the other upturned end 102b of the anchor 11 in the form of a ridge. FIG. 4 illustrates the back surface 100b of the asymmetrical anchor 11 and illustrates the groove 106 corresponding to the protrusion 104. Like the protrusion 104, the corresponding groove 106 extends from the one upturned end 102a of the anchor 11 to the other upturned end 102b on the back surface 100b, and is complementary to the protrusion 104.

FIGS. 3-5 illustrate a first embodiment of retainer 10 including bridle 20 and anchor 11, which are connected to each other by a pair of resiliently extensible legs 45. Bridle 20 comprises spar 21 defining a lower portion of bridle 20, curvilinear upper strip or member 22 defining an upper portion of bridle 20, with member 22 having downturned ends that merge into opposed upturned ends of spar 21. Preferably, spar 21 comprises ridge 23 and joining plates 24 disposed at the opposed upturned ends of spar 21. Ridge 23 can have rib 19 that extends along front and rear surfaces of ridge 23 and terminates proximal to upwardly turned ends 35 on joining plates 24 to provide reinforcement and controlled resiliency of spar 21, relative to member 22. That is, member 22 preferably is more resilient than spar 21. When considered in combination with the differences in a narrower portion 32 of separator 30, the upper portion of bridle 20, primarily member 22, is more resilient than the lower portion of bridle 20, primarily ridge 23. Separator 30 is attached at a midpoint of ridge 23 and extends to attach to a midpoint of upper member 22, preferably at depression or valley 25 formed by a curvature of upper member 22 inwardly towards spar 21. The midpoints of spar 21 and ridge 23 generally are located at a midpoint between joining plates 24. Separator 30 divides bridle 20 into left and right receiving openings or loops 26, 27, such that member 22, spar 21, and separator 25 generally resemble an eyeglass frame. Separator 30 can have a broader portion at its base 31 adjacent spar 21, and a narrower portion 32 at its upper end, adjacent upper member 22.

Within each loop 26, 27, bridle 20 also includes an extensible strap 28 extending between upper member 22 and spar 21, and merging into spar 21 between the respective joining plate 35 and separator 30. Straps 28 are formed with a convoluted or serpentine configuration in the plane of FIG. 3 typically as mirror images of each other and each includes a number of bends, so that straps 28 are capable of resilient elongation by straightening the curved portions thereof. The purpose of this convoluted configuration is disclosed in more detail below.

Each loop 26, 27 further includes tab 29 projecting inwardly from upper member 22 into the interior of each loop 26, 27. Preferably tab 29 is located along member 22 between the junction of strap 28 and member 22 and joining plate 24 and generally in the plane of FIG. 3. Tab 29 may be formed as a unitary plate, or by a plurality of fingers interconnected at their distal ends by a tab edge, the latter of which is shown in the drawings, and which represents a material savings over a unitary plate. Tab 29 facilitates engagement of hocks 56, 57 with straps 28 by guiding hocks 56, 57 into engagement with straps 28 as hocks 56, 57 are inserted into loops 26, 27. Tab 29 also guides hocks 56, 57 into engagement with the base 31 of separator 30 which assists in retaining legs 52, 53 in position. Once hocks 56, 57 have been received into loops 26, 27, as described below, tabs 29 slip behind hocks 56, 57 to ankles 70, 71 and assist in retaining hocks 56, 57 in bridle 20.

Appendage 40, such as a ring, in the plane of FIG. 3 is disposed centrally beneath bridle 20 and attached to spar 21. As may be seen in reference to FIG. 6, application of a force F against appendage 40 (or spar 21) permits rotation of bridle 20 as a planar body about axis A. If appendage 40 is defined as a ring to form a finger hold for gripping and manipulating retainer 10 during application and removal of retainer 10 from legs 52, 53, one or more stiffeners 43 adjacent to spar 21 can be provided to reinforce ring appendage 40. Stiffeners 43 may be formed as a unitary plate or a pair of plates, as illustrated, in order to prevent collapse of ring appendage 40 and maintain a substantially planar relation to ridge 23 when pulling on ring appendage 40 during insertion and/or removal of retainer 10 in a bird. Ring appendage 40 also may have a pair of slots 42 at opposite sides thereof to serve as indexing means for stacking or manipulating retainers 10 in a predetermined orientation, such as in a holder located near a poultry processing worker, or in a magazine that feeds retainer 10 to automated poultry processing equipment.

Plates 24 serve as the connecting components between extensible legs 45 and bridle 20. Although extensible legs 45 can connect directly to the side of bridle 20 created at the convergence of spar 21 and upper member 22, proximal to upwardly turned end 35, the use of additional material in the form of plates 24 adds strength to the retainer 10 at a point where flexing and tensioning occurs. Specifically, as bridle 20 is rotated about axis A and pulled away from anchor 11 during the process of trussing legs 52, 53, rotational and tensional strain is placed on the connection between extensible legs 45 and bridle 20. Plates 45 assist in coping with this strain.

Extensible legs 45 connecting bridle 20 to anchor 11 can have inwardly inclined portions 46 that extend toward each other below bridle 20 and then outwardly into engagement with anchor beam 12 to form a V-shaped knee or flexible joint 47. The lower or outwardly inclined portions 48 of extensible legs 45 also may have an increased or larger cross section to prevent bending of same so that the rigid lower portions improve the gripping action of anchor beam 12. Extensible legs 45 may be resiliently extended at knee 47 to assist in extending bridle 20 when attaching retainer 10 to hocks 56, 57. Further, the V-shape of knee 47 better conforms to the shape of the bird, specifically the narrower gap between extensible legs 45 correspond with the opening of cavity 66.

Asymmetrical anchor 11 includes anchor beam 12, which is substantially inflexible, or at least relatively inflexible or less flexible relative to upper member 22 and extensible legs 45. Front surface 100a of anchor beam 12 is asymmetrical relative to back surface 100b. More specifically, front surface 100a (FIGS. 2-3) defines a protrusion 104 that extends preferably from one upturned end 102a to the other upturned end 102b and that is structured as a raised ridge of extra material. In certain exemplary embodiments, protrusion 104 is not a continuous and even ridge, but instead a declining serrated slope or other intermittent and varied shape and structure. For example, protrusion 104 may be defined by a series of periodic protrusions also forming a ridge along the front surface 100a of the anchor beam 12. Protrusion 104 also can be a straight, shorter, ridge only on the central portion of anchor 11, such as along only the straight central portion 13 disclosed herein.

Anchor beam 12 is formed of a straight central portion 13 including a generally rectangular plate 14 with reinforcing ribs 15 along the top and bottom sides thereof. Upturned ends 102a, 102b, which are the outer ends 16a, 16b of anchor beam 12, are arcuate extensions of central portion 13 and each has an arcuate upper indentation. The protrusion 104 extends across the straight central portion 13 on the front side surface 100a from outer end 16a to outer end 16b. Ribs 15 can extend along the arcuate surfaces along outer ends 16a, 16b, as illustrated in FIG. 3. As taught herein, the asymmetrical anchor 11 with upturned ends 102a, 102b and protrusion 104 cooperates with the interior of eviscerated carcass 51, typically in the kidney cavities (FIG. 9) or the ribs (not shown), to anchor retainer 10 within cavity 66.

As shown in FIG. 4, anchor 11 also defines groove 106 corresponding to the protrusion 104. Groove 106 also extends from the one upturned end 102a of the anchor 11 to the other upturned end 102b, but on the back surface 100b of anchor beam 12. As taught herein, the protrusion 104 on the front surface 100a and the complementary groove 106 on the back surface 100b serve as an alignment means for stacking or manipulating a plurality of retainers 10 in a predetermined orientation and in a flush manner, such as in a stack or pack for transport and sale (see FIG. 10). In certain exemplary embodiments, cooperation and nesting as between the protrusion 104 on the front surface 100a and the complementary groove 106 on the back surface 100b provides sufficient friction to retain a plurality of retainers 10n in a stack with minimal packaging (cardboard or otherwise) or bands (rubber or otherwise). In other words, protrusion 104 of one retainer 10 fits within and cooperates with groove 106 of another retainer 10 whereby retainers 10 can be more easily and efficiently stacked together for shipping and handling. Protrusion 104 and groove 106 can be structured and manufactured to provide a friction fit that will retain a protrusion 104 of a first retainer within a groove 106 of a second retainer 10, yet also will allow the two retainers to be separated by a person for individual insertion into a carcass 51.

FIG. 7 illustrates an eviscerated carcass 51 of a turkey, for example, having legs 52, 53 engaged by retainer 10. Retainer 10 is intended for use with an eviscerated carcass 51 such as a turkey, chicken, or the like, and is employed to retain the legs 52, 53 of such fowl tightly against the bird's body. Preferably, retainer 10 extends over the rear body opening with hocks 56, 57 of legs 52, 53 pressed together. Carcass 51 has the feet and lower legs removed at hocks 56, 57 of legs 52, 53. Hocks 56, 57 are larger in cross-section (diameter) than the leg bones immediately behind hocks 56, 57 (ankles 70, 71) and each include a pair of knuckles 58, 59 with crease or cleft 61 between knuckles 58, 59. With legs 52, 53 drawn tightly against carcass 51 at the rear end thereof, hock knuckle creases 61 will be seen to be somewhat inclined with respect to vertical.

Application of retainer 10 to a bird is first carried out by inserting anchor beam 12 of retainer 10 preferably into the kidney holes adjacent the backbone of the carcass 51 through a rear body opening into cavity 66. Retainer 10 is tilted and one outer end 16 of anchor beam 12 is inserted into one of the kidney holes of the back structure of the carcass 51. It will be appreciated that access to the backbone structure or the like is achieved through the rear body opening into cavity 66 after the carcass 51 has been eviscerated. Following insertion of an outer end 16 of anchor beam 12 in a kidney opening, retainer 10 then is moved substantially as far as possible toward that kidney opening wherein one entire outer end 16 of anchor beam 12 extends through such opening. It will be appreciated that the V-shaped portion of extensible legs 45 allow for movement of retainer 10 sufficiently into the kidney hole such that the other outer end 16 of anchor beam 12 may then be pivoted downwardly past the bone structure of the backbone so as to align the other outer end 16 of anchor beam 12 with the opposite kidney opening. Retainer 10 is then moved so other outer end 16 extends through the other kidney opening. In this position, retainer 10 is fully inserted into the carcass 51, as illustrated in FIG. 9, wherein it will be seen that retainer 10 is firmly engaged with the backbone structure of the carcass 51. This provides a very secure anchor for retainer 10 so that bridle 20 may be affixed about hocks 56, 57 to tightly truss the same against the body of the carcass 51 in close relation to the rear body opening 66. Alternatively, anchor beam 12 also may be secured to the internal portion of the carcass 51 such as in the rib section.

FIG. 7 shows the present invention in a pre-application state. More specifically, FIG. 7 illustrates retainer 10 anchored within cavity 66. As can be seen, anchor beam 12 is anchored within cavity 66. Extensible legs 45 extend outward from cavity 66 with V-shaped knee 47 cooperating with the body components of carcass 51 corresponding to the opening of cavity 66. Bridle 20 remains outside of the carcass 51.

FIG. 8 shows the present invention in a during application state. More specifically, bridle 20 has been pivoted about joining plates 24, causing a twist in the connection between extensible legs 45 and plates 24. As the material of retainer 10 has an elastic quality, bridle 20 desires to return to its untwisted position. Thus, because this twisted position is not the position of manufacture, retainer 10 is urged by such twisting deformation to its original flat position, and when retainer 10 is placed on hocks 56, 57, this urging forces hocks 56, 57 to maintain their position against carcass 51 and in juxtaposition to each other. Once hocks 56, 57 are substantially within loops 26, 27, bridle 20 will attempt to return to its original positions and, as it is prevented from doing so by the presence of legs 52, 53, bridle 20 keeps hocks 56, 57 and thereby legs 52, 53 in constant force and thereby held against carcass 51. Further, extensible legs 45 act like a spring and such that if a sudden jolt forces legs 52, 53 to rise, extensible legs 45 will react like a spring, thus providing a force to legs 52, 53 to return them to their original, proximal positioning. Such a system is particularly useful in the processing of poultry in which carcasses are tumbled in a spin chill to cool the poultry and unconstrained legs are apt to become damaged.

Reinforcing rib 19 of spar 21 will permit bridle 20 to tilt in a generally planar relation about axis A shown in FIGS. 3 and 6, as the relatively thinner extensible legs 45 will flex adjacent to joining plates 24. Bridle 20 is pulled generally away from carcass 51 and legs 52, 53 are brought inwards, typically one at a time, over extensible legs 45. Hocks 56, 57 then are inserted, preferably individually, within loops 26, 27, respectively. In this manner, spar 21 of upper member 22 can be readily positioned along a line generally above and behind hocks 56, 57 such that tabs 29 urge hocks 56, 57 into engagement with straps 28 as hocks 56, 57 are pressed into loops 26, 27. Straps 28 stretch to extend along creases 61 between knuckles 58, 59. Unlike in many trussing devices in which the separator must be independently manipulated between the hocks, due to the structural configuration of the present invention, separator 30 slides between hocks 56, 57, with broader portion 31 assisting in keeping hocks 56, 57 juxtaposed yet separate from each other.

As hocks 56, 57 slide into loops 26, 27, tabs 29 slip behind hocks 26, 27 to ankles 70, 71 such that tabs 29 engage hocks 56, 57 from behind knuckles 58, 59 to assist in retaining hocks 56, 57 in their respective loops 26, 27. It will be seen that upper member 22 encircles hocks 56, 57 across the bottom and sides thereof to resiliently pull hocks 56, 57 together into the position shown in FIG. 9 with spar 21 extending above and behind knuckles 58, 59 so that hocks 56, 57 are retained in the position illustrated, and hold legs 52, 53 tightly against the body of the bird preferably across the rear body opening 66. Separator 30 thus is disposed between respective separate legs 52, 53 and is seated in proper position by resilient deformation of other portions of retainer 10 so as to prevent possible movement of legs 52, 53. Release of appendage 40 further permit base 31 of separator 20 to be further drawn between hocks 56, 57 to position spar 21 above and behind knuckles 58, 59.

It will be appreciated that the ability of bridle 20 to pivot about axis A in a planar orientation, in combination with the relative flexibility of the upper portion of bridle 20 relative to spar 21 at the lower portion of bridle 20, is an advantage of the invention. This configuration permits spar 21 to be readily positioned above and behind hocks 56, 57 so that the hocks 56, 57 may be captured or lassoed by bridle 20 as spar 21 is drawn downward under resilient tension of retainer 10 into position above and behind hocks 56, 57, thus forcing legs 52, 53 downward against carcass 51. Concurrently, upper member 22 remains below and behind hocks 56, 57 to assist in retaining hocks 56, 57 within loops 26, 27. FIG. 9 illustrates a properly trussed carcass 51.

Preceding this attachment of retainer 10 to legs 52, 53, the bird's tail is preferably folded up under legs 52, 53 and across rear body opening to cavity 66 to thus at least partly seal rear body opening to cavity 66 by pressure of retained legs 52, 53 thereon. Alternatively, owing to the resiliency of retainer 10 elements, the tail may be tucked under legs 52, 53 subsequent to their securement in bridle 20. The trussed bird is then in condition for further processing or sale. Such further processing often includes freezing of the bird and packaging of same by a transparent polymer skin or cover tightly molded to the exterior of the bird. The trussed condition of legs 52, 53 in the above-described position with the tail tucked thereunder provides a relatively smooth configuration that is well adapted to receive a plastic wrapper or the like. In use the wrapper is removed by the cook and after defrosting of a frozen bird the tail may be removed from the illustrated position of FIG. 9 for stuffing the bird and then again tucked under legs 52, 53 to seal the rear body opening to retain stuffing or filling within body cavity 66 of the bird.

FIG. 10 illustrates how a plurality of the retainers 10 can be placed in a stack, wherein protrusion 104 of one retainer 10 is inserted into the complementary groove 106 on a neighboring retainer 10 in a predetermined orientation and in a flush manner, such as in a stack or pack for transport and sale. In certain exemplary embodiments, cooperation and nesting as between the protrusion 104 on the front surface 100*a* and the complementary groove 106 on the back surface 100*b* provides sufficient friction to retain a plurality of retainers 10*n* in a stack with minimal packaging (see, e.g., FIGS. 19-22) or bands (rubber or otherwise). In other words, protrusion 104 of one retainer 10 fits within and cooperates with groove 106 of another retainer 10 whereby retainers 10 can be more easily and efficiently stacked together for shipping and handling. As taught herein, protrusion 104 and groove 106 can be structured and manufactured to provide a friction fit that will retain a protrusion 104 of a first retainer within a groove 106 of a second retainer 10, yet also will allow the two retainers to be separated by a person for individual insertion into a carcass 51.

FIG. 11 is a perspective view of a second exemplary embodiment of the retainer 10 of the present invention. Retainer 10 of the second exemplary embodiment also has an anchor 11 portion for anchoring retainer 10 into cavity 66 of eviscerated carcass 51, and hock retaining means or bridle 20 portion that is designed to hold together exposed hocks 56, 57 of carcass 51 of FIG. 1, which can be particularly advantageous during processing, packaging, shipping, storing, and/or cooking.

Similar to the first exemplary embodiment, anchor 11 of the second exemplary embodiment is asymmetrical. The front surface 100*a* (FIG. 12 front view) compared to the back surface 100*b* (FIG. 13 rear view) reveal an asymmetry (compare front 100*a* to back 100*b*), which is not only particularly advantageous for engaging retainer 10 to the carcass 51 but also for engaging and stacking retainers 10*n*. In particular, as shown in FIG. 12, the front surface 100*a* of the asymmetrical anchor 11 defines a protrusion 104 that extends from one upturned end 102*a* of anchor 11 to the other upturned end 102*b* of anchor 11 in the form of a ridge. FIG. 13 illustrates the back surface 100*b* of the asymmetrical anchor 11 and illustrates groove 106 corresponding to protrusion 104. Like protrusion 104, the corresponding groove 106 extends from the one upturned end 102*a* of anchor 11 to the other upturned end 102*b* on the back surface 100*b*, and is complementary to protrusion 104.

The second exemplary embodiment of retainer 10 also includes bridle 20 and anchor 11, which are connected to each other by a pair of resiliently extensible legs 45. Bridle 20 comprises spar 21, which in the second exemplary embodiment defines an upper portion of bridle 20, curvilinear lower strip or member 22A defining a lower portion of bridle 20, and side members 22B that connect each end of spar 21 with each end of member 22A. Preferably, spar 21 is more resilient than member 22A, namely, member 22A is more flexible than spar 21, generally by being a thinner piece of material and/or by not having strengthening ridges.

Bridle 20 further comprises left and right receiving openings or loops 26, 27. Within each loop 26, 27, bridle 20 also includes extensible straps 28A, 28B, 28C, with strap 28A extending between member 22A and spar 21, strap 28B extending between strap 28A and spar 21, and strap 28C extending between member 28A and side member 22B. Straps 28A, 28B, 28C are formed with a convoluted or serpentine configuration in the plane of FIG. 12 typically as mirror images of each other in respective loop 26, 27 and each of straps 28A, 28B, 28C includes bends, so that straps 28A, 28B, 28C are capable of resilient elongation by straightening the curved portions thereof. The purpose of this convoluted configuration is disclosed in more detail below. Stabilizing straps 44 extend between strap 28C and side member 22B to provide additional stabilization and retention to hocks 56, 57 when retainer 10 is being used.

In this second exemplary embodiment, appendage 40, such as a ring, in the plane of FIG. 12 is disposed centrally above bridle 20 and attached to spar 21. As disclosed in more detail herein, appendage 40 can act as a finger grip for manipulating retainer 10 and applying retainer 10 to poultry hocks 56, 57. In this second exemplary embodiment, separator 30 is in the form of a tab 31A attached to spar 21, and extending inwardly towards the center of bridle 20 between loops 26, 27. Tab 31A can fit between, and keep separated from each other, hocks 56, 57. In other words, tab 31A passes over the inner sides of hock knuckles 58, 59 and comes to rest behind hock knuckles 58, 59 at ankles 70, 71 so as to retain hocks 56, 57 more securely within loops 26, 27 and to create and complete a generally basket-like structure out of loops 26, 27 and straps 28 when properly on the hocks 56, 57. This basket-like structure allows the basket to extend outwards a sufficient distance to allow tab 31A to move behind knuckles 58, 59 of hocks 56, 57 and efficiently separate hocks 56, 57 and holds retainer 10 in a proper position during processing of the poultry, yet keeps tab 31A from not pointing backwards into the cavity of carcass 51, which adds functionality to the retainer 10. If tab 31A points backwards into cavity 66 of carcass 51, tab 31A will not have as good a hold on hocks 56, 57.

Tab 31A fits behind knuckles 58, 59 proximal to ankles 70, 71 and can perform at least two additional functions. First, by fitting behind knuckles 58, 59, tab 31A assists in retaining retainer 10 on hocks 56, 57. More specifically, as retainer 10 holds hocks together, retainer 10 pulls hocks 56, 57 together such that tab 31A in effect is wedged between ankles 70, 71 behind knuckles 58, 59, thereby assisting in holding retainer 10 on hocks. Second, the combination of tab 31A, straps 28, and members 22 assists in retaining hocks 56, 57 in a juxtaposed position relative to each other, whereby neither of hocks 56, 57 is likely to raise upwards relative to the other of hocks 56, 57. By maintaining hocks 56, 57 relatively even to each other, hocks 56, 57 are less likely to interfere with, tear, or otherwise damage packaging material (e.g., plastic wrap) later placed over the carcass 51.

Extensible legs 45 connecting bridle 20 to anchor 11 can have inwardly inclined portions 46 that extend toward each other below bridle 20 and then outwardly into engagement with anchor beam 12 to form a V-shaped knee or flexible joint 47. The lower or outwardly inclined portions 48 of extensible legs 45 also may have an increased or larger cross section to prevent bending of same so that the rigid lower portions improve the gripping action of anchor beam 12. Extensible legs 45 may be resiliently extended at knee 47 to assist in extending bridle 20 when attaching retainer 10 to hocks 56, 57. Further, the V-shape of knee 47 better conforms to the shape of the bird, specifically the narrower gap between extensible legs 45 correspond with the opening of cavity 66.

In this second exemplary embodiment, asymmetrical anchor 11 also includes anchor beam 12, which is substantially inflexible, or at least relatively inflexible or less flexible relative to member 22A and extensible legs 45. Front surface 100a of anchor beam 12 is asymmetrical relative to back surface 100b. More specifically, front surface 100a (FIG. 12) defines a protrusion 104 that extends preferably from one upturned end 102a to the other upturned end 102b and that is structured as a raised ridge of extra material. In certain exemplary embodiments, protrusion 104 is not a continuous and even ridge, but instead a declining serrated slope or other intermittent and varied shape and structure. For example, protrusion 104 may be defined by a series of periodic protrusions also forming a ridge along the front surface 100a of the anchor beam 12. Protrusion 104 also can be a straight, shorter, ridge only on the central portion of anchor 11, such as along only the straight central portion 13 disclosed herein.

Anchor beam 12 is formed of a straight central portion 13 including a generally rectangular plate 14. Upturned ends 102a, 102b, which are the outer ends 16a, 16b of anchor beam 12, are arcuate extensions of central portion 13 and each has an arcuate upper indentation. The protrusion 104 extends across the straight central portion 13 on the front side surface 100a from outer end 16a to outer end 16b. As taught herein, the asymmetrical anchor 11 with upturned ends 102a, 102b and protrusion 104 cooperates with the interior of eviscerated carcass 51, typically in the kidney cavities (see, e.g., FIG. 9) or the ribs (not shown), to anchor retainer 10 within cavity 66.

As shown in FIG. 13, anchor 11 also defines groove 106 corresponding to the protrusion 104. Groove 106 also extends from the one upturned end 102a of the anchor 11 to the other upturned end 102b, but on the back surface 100b of anchor beam 12. As taught herein, the protrusion 104 on the front surface 100a and the complementary groove 106 on the back surface 100b serve as an alignment means for stacking or manipulating a plurality of retainers 10 in a predetermined orientation and in a flush manner, such as in a stack or pack for transport and sale (see, e.g., FIG. 10). In certain exemplary embodiments, cooperation and nesting as between the protrusion 104 on the front surface 100a and the complementary groove 106 on the back surface 100b provides sufficient friction to retain a plurality of retainers 10n in a stack with minimal packaging (see, e.g., FIGS. 19-22) or bands (rubber or otherwise). In other words, protrusion 104 of one retainer 10 fits within and cooperates with groove 106 of another retainer 10 whereby retainers 10 can be more easily and efficiently stacked together for shipping and handling. Protrusion 104 and groove 106 can be structured and manufactured to provide a friction fit that will retain a protrusion 104 of a first retainer within a groove 106 of a second retainer 10, yet also will allow the two retainers to be separated by a person for individual insertion into a carcass 51.

Application of this second exemplary embodiment of retainer 10 to a bird is first carried out by inserting anchor beam 12 of retainer 10 preferably into the kidney holes adjacent the backbone of the carcass 51 through a rear body opening into cavity 66. Retainer 10 is tilted and one outer end 16 of anchor beam 12 is inserted into one of the kidney holes of the back structure of the carcass 51. It will be appreciated that access to the backbone structure or the like is achieved through the rear body opening into cavity 66 after the carcass 51 has been eviscerated. Following insertion of an outer end 16 of anchor beam 12 in a kidney opening, retainer 10 then is moved substantially as far as possible toward that kidney opening wherein one entire outer end 16 of anchor beam 12 extends through such opening. It will be appreciated that the V-shaped portion of extensible legs 45 allow for movement of retainer 10 sufficiently into the kidney hole such that the other outer end 16 of anchor beam 12 may then be pivoted downwardly past the bone structure of the backbone so as to align the other outer end 16 of anchor beam 12 with the opposite kidney opening. Retainer 10 is then moved so other outer end 16 extends through the other kidney opening. In this position, retainer 10 is fully inserted into the carcass 51, see, e.g., FIG. 9, wherein it will be seen that retainer 10 is firmly engaged with the backbone structure of the carcass 51. This provides a very secure anchor for retainer 10 so that bridle 20 may be affixed about hocks 56, 57 to tightly truss the same against the body of the carcass 51 in close relation to the rear body opening 66. Alternatively, anchor beam 12 also may be secured to the internal portion of the carcass 51 such as in the rib section.

In a manner similar that that shown in FIG. 7, the second exemplary embodiment of retainer 10 is also anchored within cavity 66 via anchor beam 12 being anchored within cavity 66. Extensible legs 45 extend outward from cavity 66 with V-shaped knee 47 cooperating with the body components of carcass 51 corresponding to the opening of cavity 66. Bridle 20 remains outside of the carcass 51.

This second exemplary embodiment does not have a pivoting bridle relative to anchor 11. More specifically, this second exemplary embodiment has a simpler application process whereby the user grasps appendage 40 and simply pulls the retainer 10 up and over hocks 56, 57 such that hocks 56, 57 are inserted into loops 26, 27, respectively. As the material of retainer 10 has an elastic quality, when retainer 10 is placed on hocks 56, 57, the various components of bridle, namely, spar 21, member 22A, side members 22B, and straps 28A, 28B, 28C contact and retain hocks 56, 57, and urge hocks 56, 57 to a position against carcass 51 and in juxtaposition to each other, and maintain hocks 56, 57 against carcass 51. Thus, once hocks 56, 57 are substantially within loops 26, 27, bridle 20 keeps hocks 56, 57 held thereby and legs 52, 53 in constant force and thereby held against carcass 51. Further, extensible legs 45 act like a spring and such that if a sudden jolt forces legs 52, 53 to rise, extensible legs 45 will react like a spring, thus providing a force to legs 52, 53 to return them to their original, proximal positioning. Such a system is particularly useful in the processing of poultry in which carcasses are tumbled in a spin chill to cool the poultry and unconstrained legs are apt to become damaged.

In more detail, when applying this second exemplary embodiment to a bird, bridle 20 is pulled generally away from carcass 51 and legs 52, 53 are brought inwards, typically one at a time, and are inserted into loops 26, 27, respectively. Although, as in the first exemplary embodiment, legs 52, 53 can be inserted one at a time into loops 26, 27, due to the structure of this second exemplary embodiment, it is possible for the bridle 20 to be pulled over both legs 52, 53 simultaneously, whereby both hocks 56, 57 can be inserted into loops 26, 27 simultaneously. Spar 21 of member 22A can be readily positioned along a line generally above and behind hocks 56, 57 as hocks 56, 57 are pressed into loops 26, 27, and straps 28A, 28B, 28C stretch to engage hocks 56, 57, such as for example strap 28B engaging creases 61 between knuckles 58, 59, and straps 28A, 28C engaging the sides of knuckles 58, 59 proximal to ankles 70, 71. Unlike in many trussing devices in which a separator must be independently manipulated between the hocks, due to the structural configuration of the present invention, separator in the form of tab 31A slides between hocks 56, 57, assisting in keeping hocks 56, 57 juxtaposed yet separate from each other.

As hocks 56, 57 slide into loops 26, 27, straps 28A, 28C slip behind hocks 26, 27 to or towards ankles 70, 71 such that straps 28A, 28C and tab 31A engage hocks 56, 57 from behind knuckles 58, 59 to assist in retaining hocks 56, 57 in the respective loops 26, 27. It will be seen that member 22A and side member 22B effectively encircle hocks 56, 57 across the bottom and sides thereof to resiliently pull hocks 56, 57 together into the position shown in FIG. 9, which illustrates the first exemplary embodiment and is analogous for the second exemplary embodiment, with spar 21 extending above and behind knuckles 58, 59 so that hocks 56, 57 are retained in the position illustrated, and hold legs 52, 53 tightly against the body of the bird preferably across the rear body opening 66. Tab 31A thus is disposed between respective separate legs 52, 53 and is seated in proper position by resilient deformation of other portions of retainer 10 so as to reduce or prevent possible movement of legs 52, 53 and assist in holding retainer 10 on hocks 56, 57.

FIG. 15 is a perspective view of a third exemplary embodiment of the retainer 10 of the present invention, which effectively is a simplified version of the second exemplary embodiment described herein. Retainer 10 of the third exemplary embodiment also has an anchor 11 portion for anchoring retainer 10 into cavity 66 of eviscerated bird carcass 51, and hock retaining means or bridle 20 portion that is designed to hold together exposed hocks 56, 57 of carcass 51 of FIG. 1, which can be particularly advantageous during processing, packaging, shipping, storing, and/or cooking.

Also similar to the first exemplary embodiment, anchor 11 of the third exemplary embodiment is asymmetrical. The front surface 100a (FIG. 16 front view) compared to the back surface 100b (FIG. 17 rear view) reveal an asymmetry (compare front 100a to back 100b), which is not only particularly advantageous for engaging retainer 10 to carcass 51 but also for engaging and stacking retainers 10n. In particular, as shown in FIG. 16, the front surface 100a of the asymmetrical anchor 11 defines a protrusion 104 that extends from one upturned end 102a of anchor 11 to the other upturned end 102b of anchor 11 in the form of a ridge. FIG. 17 illustrates the back surface 100b of the asymmetrical anchor 11 and illustrates groove 106 corresponding to protrusion 104. Like protrusion 104, the corresponding groove 106 extends from the one upturned end 102a of anchor 11 to the other upturned end 102b on the back surface 100b, and is complementary to protrusion 104.

The third exemplary embodiment of retainer 10 also includes bridle 20 and anchor 11, which are connected to each other by a pair of resiliently extensible legs 45. Bridle 20 comprises spar 21, which in the second exemplary embodiment defines an upper portion of bridle 20, two curvilinear retaining straps 28D, connecting member 22C connecting the two retaining straps 28D across the middle of bridle 20, and side members 22B that connect each end of spar 21 with an end of retaining strap 28D. Preferably, spar 21 is more resilient than retraining strap 28D and connecting member 22C, namely, restraining strap 28D and connecting member 22C are more flexible than spar 21, generally by being thinner pieces of material and/or by not having strengthening ridges.

Bridle 20 further comprises left and right receiving openings 26, 27, in this embodiment formed in an area bounded in part by spar 21, side members 22B, and tab 31A. Restraining straps 28D extend between spar 21 and side members 22B, and a respective one of restraining straps 28D generally bisects each opening loops 26, 27. Restraining straps 28D are formed with a convoluted or serpentine configuration in the plane of FIG. 16 typically as mirror images of each other in respective opening loop 26, 27 and each of restraining straps 28D includes bends, so that restraining straps 28D are capable of resilient elongation by straightening the curved portions thereof. The purpose of this convoluted configuration is disclosed in more detail below.

In this third exemplary embodiment, appendage 40, such as a ring, in the plane of FIG. 16 is disposed centrally above bridle 20 and attached to spar 21. As disclosed in more detail herein, appendage 40 can act as a finger grip for manipulating retainer 10 and applying retainer 10 to poultry hocks 56, 57. In this third exemplary embodiment, separator 30 is in the form of a tab 31A attached to spar 21, and extending inwardly towards the center of bridle 20 between opening loops 26, 27. Tab 31A can fit between, and keep separated from each other, hocks 56, 57. As taught herein, tab 31A passes over the inner sides of hock knuckles 58, 59 and comes to rest behind hock knuckles 58, 59 at ankles 70, 71 so as to retain hocks 56, 57 more securely within opening loops 26, 27 and to create and complete a generally basket-like structure out of opening loops 26, 27 and straps 28 when properly on the hocks 56, 57. This basket-like structure allows the basket to extend outwards a sufficient distance to allow tab 31A to move behind knuckles 58, 59 of hocks 56, 57 and efficiently separate hocks 56, 57 and hold retainer 10 in a proper position during processing of the poultry, yet keeps tab 31A from not pointing backwards into the cavity of carcass 52, which adds functionality to the retainer 10. If tab 31A points backwards into cavity 66 of carcass 51, tab 31A will not have as good a hold on hocks 56, 57.

Also as taught herein, tab 31A fits behind knuckles 58, 59 proximal to ankles 70, 71 and can perform at least two additional functions. First, by fitting behind knuckles 58, 59, tab 31A assists in retaining retainer 10 on hocks 56, 57. More specifically, as retainer 10 holds hocks together, retainer 10 pulls hocks 56, 57 together such that tab 31A in effect is wedged between ankles 70, 71 behind knuckles 58, 59, thereby assisting in holding retainer 10 on hocks. Second, the combination of tab 31A, straps 28, and member 22 assists in retaining hocks 56, 57 in a juxtaposed position relative to each other, whereby neither of hocks 56, 57 is likely to raise upwards relative to the other of hocks 56, 57. By maintaining hocks 56, 57 relatively even to each other, hocks 56, 57 are less likely to interfere with, tear, or otherwise damage packaging material (e.g., plastic wrap) later placed over the carcass 51.

Extensible legs 45 connecting bridle 20 to anchor 11 can have inwardly inclined portions 46 that extend toward each other below bridle 20 and then outwardly into engagement with anchor beam 12 to form a V-shaped knee or flexible joint 47. The lower or outwardly inclined portions 48 of extensible legs 45 also may have an increased or larger cross section to prevent bending of same so that the rigid lower portions improve the gripping action of anchor beam 12. Extensible legs 45 may be resiliently extended at knee 47 to assist in extending bridle 20 when attaching retainer 10 to hocks 56, 57. Further, the V-shape of knee 47 better conforms to the shape of the bird, specifically the narrower gap between extensible legs 45 correspond with the opening of cavity 66.

In this third exemplary embodiment, asymmetrical anchor 11 also includes anchor beam 12, which is substantially inflexible, or at least relatively inflexible or less flexible relative to member 22A and extensible legs 45. Front surface 100a of anchor beam 12 is asymmetrical relative to back surface 100b. More specifically, front surface 100a (FIG. 16) defines a protrusion 104 that extends preferably from one upturned end 102a to the other upturned end 102b and that is structured as a raised ridge of extra material. In certain exemplary embodiments, protrusion 104 is not a continuous and even ridge, but instead a declining serrated slope or other intermittent and varied shape and structure. For example, protrusion 104 may be defined by a series of periodic protrusions also forming a ridge along the front surface 100a of the anchor beam 12. Protrusion 104 also can be a straight, shorter, ridge only on the central portion of anchor 11, such as along only the straight central portion 13 disclosed herein.

Anchor beam 12 is formed of a straight central portion 13 including a generally rectangular plate 14 with reinforcing ribs 15 along the top and bottom sides thereof. Upturned ends 102a, 102b, which are the outer ends 16a, 16b of anchor beam 12, are arcuate extensions of central portion 13 and each has an arcuate upper indentation. The protrusion 104 extends across the straight central portion 13 on the front side surface 100a from outer end 16a to outer end 16b. Ribs 15 can extend along the arcuate surfaces along outer ends 16a, 16b, as illustrated in FIG. 16. As taught herein, the asymmetrical anchor 11 with upturned ends 102a, 102b and protrusion 104 cooperates with the interior of eviscerated carcass 51, typically in the kidney cavities (see, e.g., FIG. 9) or the ribs (not shown), to anchor retainer 10 within cavity 66.

As shown in FIG. 17, anchor 11 also defines groove 106 corresponding to the protrusion 104. Groove 106 also extends from the one upturned end 102a of the anchor 11 to the other upturned end 102b, but on the back surface 100b of anchor beam 12. As taught herein, the protrusion 104 on the front surface 100a and the complementary groove 106 on the back surface 100b serve as an alignment means for stacking or manipulating a plurality of retainers 10 in a predetermined orientation and in a flush manner, such as in a stack or pack for transport and sale (see, e.g., FIG. 10). In certain exemplary embodiments, cooperation and nesting as between the protrusion 104 on the front surface 100a and the complementary groove 106 on the back surface 100b provides sufficient friction to retain a plurality of retainers 10n in a stack with minimal packaging (cardboard or otherwise) or bands (rubber or otherwise). In other words, protrusion 104 of one retainer 10 fits within and cooperates with groove 106 of another retainer 10 whereby retainers 10 can be more easily and efficiently stacked together for shipping and handling. Protrusion 104 and groove 106 can be structured and manufactured to provide a friction fit that will retain a protrusion 104 of a first retainer within a groove 106 of a second retainer 10, yet also will allow the two retainers to be separated by a person for individual insertion into a carcass 51.

Application of this third exemplary embodiment of retainer 10 to a bird is first carried out by inserting anchor beam 12 of retainer 10 preferably into the kidney holes adjacent the backbone of the carcass 51 through a rear body opening into cavity 66. Retainer 10 is tilted and one outer end 16 of anchor beam 12 is inserted into one of the kidney holes of the back structure of the carcass 51. It will be appreciated that access to the backbone structure or the like is achieved through the rear body opening into cavity 66 after the carcass 51 has been eviscerated. Following insertion of an outer end 16 of anchor beam 12 in a kidney opening, retainer 10 then is moved substantially as far as possible toward that kidney opening wherein one entire outer end 16 of anchor beam 12 extends through such opening. It will be appreciated that the V-shaped portion of extensible legs 45 allow for movement of retainer 10 sufficiently into the kidney hole such that the other outer end 16 of anchor beam 12 may then be pivoted downwardly past the bone structure of the backbone so as to align the other outer end 16 of anchor beam 12 with the opposite kidney opening. Retainer 10 is then moved so other outer end 16 extends through the other kidney opening. In this position, retainer 10 is fully inserted into the carcass 51, see, e.g., FIG. 9, wherein it will be seen that retainer 10 is firmly engaged with the backbone structure of the carcass 51. This provides a very secure anchor for retainer 10 so that bridle 20 may be affixed about hocks 56, 57 to truss the same against the body of the carcass 51 in close relation to the rear body opening 66. Alternatively, anchor beam 12 also may be secured to the internal portion of the carcass 51 such as in the rib section.

In a manner similar that that shown in FIG. 7, the third exemplary embodiment of retainer 10 is also anchored within cavity 66 via anchor beam 12 being anchored within cavity 66. Extensible legs 45 extend outward from cavity 66 with V-shaped knee 47 cooperating with the body components of carcass 51 corresponding to the opening of cavity 66. Bridle 20 remains outside of the carcass 51.

This third exemplary embodiment also does not have a pivoting bridle relative to anchor 11. More specifically, this third exemplary embodiment has a somewhat simpler application process similar to that of the second exemplary embodiment whereby the user grasps appendage 40 and simply pulls the retainer 10 up and over hocks 56, 57 such that hocks 56, 57 are inserted into openings 26, 27, respectively. As the material of retainer 10 has an elastic quality, when retainer 10 is placed on hocks 56, 57, the various components of bridle, namely, spar 21, side members 22B, and restraining straps 28D contact and retain hocks 56, 57, and urge hocks 56, 57 to a position against carcass 51 and in juxtaposition to each other, and maintain hocks 56, 57 against carcass 51. Thus, once hocks 56, 57 are substantially within openings 26, 27, bridle 20 keeps hocks 56, 57 and thereby legs 52, 53 in constant force and thereby held against carcass 51. Further, extensible legs 45 act like a spring and such that if a sudden jolt forces legs 52, 53 to rise, extensible legs 45 will react like a spring, thus providing a force to legs 52, 53 to return them to their original, proximal positioning. Such a system is particularly useful in the processing of poultry in which carcasses are tumbled in a spin chill to cool the poultry and unconstrained legs are apt to become damaged.

In more detail, when applying this third exemplary embodiment to a bird, bridle 20 is pulled generally away from carcass 51 and legs 52, 53 are brought inwards, typically one at a time, and are inserted within openings 26, 27, respectively. Although, as in the first exemplary embodiment, legs 52, 53 can be inserted one at a time into openings 26, 27, due to the structure of this third exemplary embodiment, it is possible for the bridle 20 to be pulled over both legs 52, 53 simultaneously, whereby both hocks 56, 57 can be inserted into openings 26, 27 simultaneously. Spar 21 of upper member 22 can be readily positioned along a line generally above and behind hocks 56, 57 as hocks 56, 57 are pressed into openings 26, 27, and restraining straps 28D stretch to engage hocks 56, 57, along creases 61 between knuckles 58, 59, and side members 22B engaging the outer sides of knuckles 58, 59 proximal to ankles 70, 71. Unlike in many trussing devices in which a separator must be independently manipulated between the hocks, due to the structural configuration of the present invention, separator in the form of tab 31A slides between hocks 56, 57, assisting in keeping hocks 56, 57 juxtaposed yet separate from each other.

As hocks 56, 57 slide into openings 26, 27, spar 21, side members 22B, and tab 31A slip behind hocks 26, 27 to ankles 70, 71 such that spar 21, side members 22B, and tabs 31A engage hocks 56, 57 from behind knuckles 58, 59 to assist in retaining hocks 56, 57 in their respective openings 26, 27. It will be seen that spar 21, side members 22B, and tab 31A effectively encircle hocks 56, 57 across the bottom and sides thereof to resiliently pull hocks 56, 57 together into the position shown in FIG. 9, which illustrates the first exemplary embodiment and is analogous for the third exemplary embodiment, with spar 21 extending above and behind knuckles 58, 59 so that hocks 56, 57 are retained in the position illustrated, and hold legs 52, 53 against the body of the bird preferably across the rear body opening 66. Tab 31A thus is disposed between respective separate legs 52, 53 and is seated in proper position by resilient deformation of other portions of retainer 10 so as to reduce or prevent possible movement of legs 52, 53.

In each of the preferred embodiments, retainer 10 also may be conveniently removed for stuffing the bird and subsequently reattached for cooking. To remove retainer 10, the user may simply grasp appendage 40 and pull upwards such that bridle 20 will flex, as previously described, and release spar 21 from behind the hock knuckles 58, 59, thereby releasing legs 52, 53 from bridle 20.

As briefly noted above, certain steps in the processing of poultry may result in the trussed bird striking processing elements or being struck thereby, and such blows may occur to the trussed legs 52, 53 as, for example, at the hocks 56, 57 thereof. Any such blow will have a tendency to force one of legs 52, 53 inwardly of the other leg 53, 52 toward the body of the bird and this can cause one of legs 52, 53 to become unseated from retainer 10. The present invention, however, reduces or prevents this possibility by means of tabs 29 and separator 30 in the first embodiment, and tab 31A in the second and third embodiments, which resiliently engage hocks 56, 57 therebetween. Consequently, hocks 56, 57 are locked and maintained in their retained position despite blows that may strike hocks 56, 57 as the retainer engages with the bird. The types of blows that the trussed bird may receive typically will not unseat retainer 10. Thus, retainer 10 of the present invention provides a material improvement over other prior art retainers. Moreover, the improved features of retainer 10 enhance the efficiency of trussing hocks 56, 57 during poultry processing operations.

Each of the preferred embodiments of the invention also is a stackable retainer for use with a poultry carcass having legs with hocks, the retainer comprising a pair of loops or openings adapted to receive the hocks, the pair of loops defined by a bridle, wherein the bridle is for trussing the legs and retaining the hocks in place. The retainer also comprises at least one extensible strap extending generally across each of the loops, wherein the extensible strap is adapted to cooperate with the knuckle creases on the hocks. The retainer also comprises an anchor having front-back surface asymmetry and upturned ends adapted for engagement with an interior cavity of the poultry carcass. The anchor is connected by legs in depending relation to the bridle, and a protrusion is defined by the front surface of the anchor and extends from the first upturned end to the second upturned end. The back surface of the anchor defines a complementary groove that extends from the first upturned end to the second upturned end.

In another preferred embodiment, the protrusion and the complementary groove of the retainer facilitate stacking of a plurality of the retainers by aligning the position and orientation of the retainers in the stack.

In another preferred embodiment, the protrusion and the complementary groove create a friction fit when nested in a stack.

In another preferred embodiment, the asymmetrical anchor of the retainer includes a straight central portion comprising a generally rectangular plate. Each upturned end of the anchor is configured as an arcuate extension of the straight central portion of the asymmetrical anchor, and each arcuate extension has an arcuate upper indentation. The protrusion extends across the straight central portion on the front surface, from the first upturned end to the second upturned end.

In another preferred embodiment, the protrusion extends only across the rectangular plate portion of the straight central portion of one side of the anchor. In another preferred embodiment, the groove also extends only across the rectangular plate portion of another side of the anchor, namely, the opposite side where the protrusion is located.

In another preferred embodiment, the straight central portion of the anchor body comprises reinforcing ribs that extend from the first upturned end to the second upturned end, up to and including all the arcuate surfaces of the anchor.

In another preferred embodiment, the retainer comprises a means for retaining the hocks and an anchor having a front surface and a back surface and upturned ends adapted for engagement with an interior cavity of the poultry carcass, the anchor connected by legs in depending relation to the means for retaining the hocks, the front surface of the anchor defining a protrusion that extends at least partially between a first of the upturned ends and a second of the upturned ends, and the back surface of the anchor defining a groove complementary to the protrusion, the groove extends at least partially between the first upturned end and the second upturned end.

The relatively simple structure of retainer can allow it to be manufactured relatively easily with inexpensive materials. Preferably, retainer can be molded from a single piece of resilient material that can withstand cooking and processing temperatures (which can approach and exceed 500° F.). Retainer can be formed of plastic or other resilient material that permits it to deflect and resume its original shape and to take on the structure and form of the protrusion and the groove. Such plastics and other materials are evident to and known by those of skill in the art. In operation, the trussing device of this invention may be applied to the carcasses as quickly and easily as any device presently on the market. The trussing device of the present invention affords a positive and secure mechanism to hold the hocks together.

Also, the use of a protrusion and groove configuration can increase the strength of the anchor and/or the anchor beam in that protrusion provides for a strengthening ridge along anchor beam and groove provide for a strengthening indentation along anchor beam. This added strength of the anchor and/or anchor beam can allow for better retention of the device within the cavity of the bird.

The preferred material for the present invention is nylon with a thickness of up to approximately 0.30 inches, and preferably between 0.03 and 0.15 inches. This thickness range provides sufficient rigidity for retainer while permitting the resilient components of retainer to be adequately deformable via their narrow cross-section. Plastics and other polymers also are suitable and can be selected by those of ordinary skill in the art based on the use of retainer. For example, a high melting temperature material can be used for retainers intended for use in cooking, while low melting temperature materials can be used for retainers intended only for packaging and display. Further, the structure of the present invention allows the use of less material than prior art trussing devices, saving on material costs and disposal costs and bulk.

FIG. 19 is a side perspective view of a sleeve 100 for holding, storing, and shipping a plurality of the retainers 10 of the invention. Sleeve 100 comprises four sides 102A, 102B, 102C, 102D forming a hollow rectangular box having no top side or bottom side, thereby allowing access to the interior 104 of sleeve 100 via top opening 106 and bottom opening 108. Tabs 110 extend from upper edges 112B, 112D of a first set of opposing sides 102B, 102D of sleeve 100, and are located centrally along upper edges 112B, 112D. Sleeve 100 preferably is manufactured from cardboard or paper, but can be any material suitable for manufacturing sleeve 100, such as, for example, plastic or metal.

FIG. 20 is a top perspective view of the sleeve 100 of FIG. 19. In this view, the rectangular shape, hollow nature, and lack of a top side and a bottom side can be seen in more detail. Tabs 110 are shown folded inwardly towards interior 104 of sleeve 100.

FIG. 21 is a side perspective view of the sleeve 100 of FIG. 19 containing a plurality of the retainers 10 of the invention. Retainers 10, preferably already in a stack configuration as taught herein, preferably are inserted into sleeve 100 via bottom opening 108 to a position where a top edge of spar 21 of retainer 10 is even with upper edges 112B, 112D. In this position, tabs 110 can be folded inwardly towards interior 104 of sleeve 100 into the area or volume between spar 21 and appendage 40 of retainers 10. In this position, tabs 110 can help hold or retain retainers 10 within sleeve 100.

FIG. 22 is a side view of the sleeve 100 of FIG. 19 containing a plurality of the retainers 10 of the invention. When retainers 10 are inserted into sleeve, appendages 40 extend out of top opening 106 and anchors 11 extend out of bottom opening 108 of sleeve 100. Sleeve has an interior width between a second set of opposing sides 102A, 102C approximately equal to the outer width of bridle 20, which is smaller than the length of anchor 11, such that when retainers 10 are inserted into sleeve, bridles 20 will fit within interior 104 yet anchors 11 will not, whereby anchors 11 can contact bottom edges 114A, 114C of the second set of opposing sides 102A, 102C thereby preventing retainers 10 from passing all the way into and through sleeve 10. This assists in more efficient loading of sleeve 100 with retainers 10.

Sleeve 100 is sized to hold a desired number of retainers 10. For example, if it is desired for sleeve 100 to hold ten retainers 10, sleeve 100 is manufactured with the first set of opposing sides 102A, 102C of a first width, and if it is desired for sleeve 100 to hold seventeen retainers 10, sleeve 100 is manufactured with the first set of opposing sides 102A, 102C of a second width greater than first width.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A poultry leg retainer for use with a poultry carcass having legs with hocks, the retainer comprising:
   a) a bridle having a spar at a top end of the bridle, the spar having two ends, two side members each extending downward from a respective one of the two ends of the spar, the spar and the side members defining a pair of loops or openings adapted to receive the hocks;
   b) an extensible strap attached at a first end to the spar extending generally across each of the loops or openings, the extensible strap adapted to cooperate with knuckle creases on the hocks;
   c) a separator or tab projecting from the spar inwardly into a space between the loops, the separator or tab for cooperating with the hocks so as to assist in retaining the hocks within the loops or openings; and
   d) an anchor having upturned ends adapted for engagement with an interior cavity of the poultry carcass, the anchor connected by legs in depending relation to the bridle,
   wherein the bridle and extensible straps form a basket structure for retaining the hocks whereby the legs are trussed against the poultry carcass, and
   wherein the anchor further having a front surface and a back surface, the front surface of the anchor defining a protrusion that extends at least partially between a first of the upturned ends and a second of the upturned ends, and the back surface of the anchor defining a groove complementary to the protrusion, the groove extends at least partially between the first upturned end and the second upturned end.

2. The retainer of claim 1, wherein the protrusion and the complementary groove of the retainer facilitate stacking of a plurality of the retainer by aligning the position and orientation of the retainer in the stack.

3. The retainer of claim 2, wherein the protrusion and the complementary groove create a friction fit when nested in a stack.

4. The retainer of claim 2, wherein the anchor includes a straight central portion comprising a generally rectangular plate, wherein each upturned end is configured as an arcuate extension of the straight central portion of the asymmetrical anchor, and each arcuate extension has an arcuate upper indentation, and wherein the protrusion extends across the straight central portion on the front surface from the first upturned end to the second upturned end.

5. A system for stacking and retaining poultry leg retainers, the system comprising:
   a plurality of poultry leg retainers for use with a poultry carcass having legs with hocks, the retainers comprising:
   a) a bridle having a spar at a top end of the bridle, the spar having two ends, two side members each extending downward from a respective one of the two ends of the spar, the spar and the side members defining a pair of loops or openings adapted to receive the hocks;
   b) an extensible strap attached at a first end to the spar extending generally across each of the loops or openings, the extensible strap adapted to cooperate with knuckle creases on the hocks;
   c) a separator or tab projecting from the spar inwardly into a space between the loops, the separator or tab for cooperating with the hocks so as to assist in retaining the hocks within the loops or openings; and
   d) an anchor having upturned ends adapted for engagement with an interior cavity of the poultry carcass, the anchor connected by legs in depending relation to the bridle,
   wherein the bridle and extensible straps form a basket structure for retaining the hocks whereby the legs are trussed against the poultry carcass, and
   wherein the anchor further having a front surface and a back surface, the front surface of the anchor defining a protrusion that extends at least partially between a first of the upturned ends and a second of the upturned ends, and the back surface of the anchor defining a groove complementary to the protrusion, the groove extends at least partially between the first upturned end and the second upturned end; and
   a sleeve for holding a plurality of the retainers, the sleeve comprising:
   a) four sides forming a hollow rectangular box having no top side or bottom side, thereby allowing access to an interior of the sleeve via a top opening and a bottom opening;
   b) tabs extend from upper edges of a first set of opposing sides of the sleeve, the tabs being located centrally along upper edges of the first set of opposing sides.

6. The system of claim 5, wherein a plurality of the retainers, in a stack configuration, are inserted into the sleeve via the bottom opening of the sleeve to a position where a top edge of the spar of the retainer is even with the upper edges of the sleeve whereby the tabs are folded inwardly towards the interior of the sleeve into an area or volume between the spar and appendages of the retainers for holding the retainers within the sleeve.

7. The system of claim 6, wherein when the retainers are inserted into the sleeve, the appendages of the retainers extend out of the top opening of the sleeve and anchors of the retainers extend out of the bottom opening of the sleeve.

8. The system of claim 7, wherein the sleeve has an interior width between a second set of opposing sides of the sleeve approximately equal to an outer width of the bridles of the retainers, the outer width of the bridles of the retainers being smaller than a length of the anchors of the retainers, whereby when the retainers are inserted into the sleeve, the bridles of the retainers fit within the interior of the sleeve yet the anchors of the retainers do not fit within the interior of the sleeve, thereby preventing the retainers from passing all the way into and through the sleeve.

9. A method for stacking and retaining poultry leg retainers, the method comprising the steps of:
   providing a plurality of poultry leg retainers for use with a poultry carcass having legs with hocks, the retainers comprising:
   a) a bridle having a spar at a top end of the bridle, the spar having two ends, two side members each extending downward from a respective one of the two ends of the spar, the spar and the side members defining a pair of loops or openings adapted to receive the hocks;
   b) an extensible strap attached at a first end to the spar extending generally across each of the loops or openings, the extensible strap adapted to cooperate with knuckle creases on the hocks;

c) a separator or tab projecting from the spar inwardly into a space between the loops, the separator or tab for cooperating with the hocks so as to assist in retaining the hocks within the loops or openings; and d) an anchor having upturned ends adapted for engagement with an interior cavity of the poultry carcass, the anchor connected by legs in depending relation to the bridle, wherein the bridle and extensible straps form a basket structure for retaining the hocks whereby the legs are trussed against the poultry carcass, and wherein the anchor further having a front surface and a back surface, the front surface of the anchor defining a protrusion that extends at least partially between a first of the upturned ends and a second of the upturned ends, and the back surface of the anchor defining a groove complementary to the protrusion, the groove extends at least partially between the first upturned end and the second upturned end;

providing a sleeve for holding a plurality of the retainers, the sleeve comprising:

a) four sides forming a hollow rectangular box having no top side or bottom side, thereby allowing access to an interior of the sleeve via a top opening and a bottom opening;

b) tabs extend from upper edges of a first set of opposing sides of the sleeve, the tabs being located centrally along upper edges of the first set of opposing sides; and stacking the retainers in a releasable configuration, wherein the protrusion of one of the retainers inserted into the groove of a neighboring one of the retainers.

10. The method of claim 9, further comprising the step of inserting the plurality of the retainers, in a stack configuration, into the sleeve via the bottom opening of the sleeve to a position where a top edge of a spar of the retainer is even with the upper edges of the sleeve whereby the tabs of the sleeve are folded inwardly towards the interior of the sleeve into an area or volume between the spar and appendages of the retainers for holding the retainers within the sleeve.

11. The method of claim 10, wherein when the retainers are inserted into the sleeve, the appendages of the retainers extend out of the top opening of the sleeve and anchors of the retainers extend out of the bottom opening of the sleeve.

12. The method of claim 11, wherein the sleeve has an interior width between a second set of opposing sides of the sleeve approximately equal to an outer width of the bridles of the retainers, the outer width of the bridles being smaller than a length of the anchors, whereby when the retainers are inserted into the sleeve, the bridles of the retainers fit within the interior of the sleeve yet the anchors of the retainers do not fit within the interior of the sleeve, thereby preventing the retainers from passing all the way into and through the sleeve.

* * * * *